United States Patent
Douglas

(10) Patent No.: US 10,846,911 B1
(45) Date of Patent: Nov. 24, 2020

(54) 3D IMAGING OF VIRTUAL FLUIDS AND VIRTUAL SOUNDS

(71) Applicant: Robert Edwin Douglas, Winter Park, FL (US)

(72) Inventor: Robert Edwin Douglas, Winter Park, FL (US)

(*) Notice: Subject to any disclaimer, the term of this patent is extended or adjusted under 35 U.S.C. 154(b) by 0 days.

(21) Appl. No.: 16/779,658

(22) Filed: Feb. 2, 2020

Related U.S. Application Data

(63) Continuation-in-part of application No. 16/506,073, filed on Jul. 9, 2019.

(60) Provisional application No. 62/906,125, filed on Sep. 26, 2019.

(51) Int. Cl.
| | |
|---|---|
| H04N 7/18 | (2006.01) |
| G06T 15/08 | (2011.01) |
| G06T 19/20 | (2011.01) |
| G06T 7/11 | (2017.01) |
| H04S 7/00 | (2006.01) |

(52) U.S. Cl.
CPC .......... *G06T 15/08* (2013.01); *G06T 7/11* (2017.01); *G06T 19/20* (2013.01); *H04S 7/303* (2013.01); *G06T 2207/30104* (2013.01); *G06T 2210/24* (2013.01); *G06T 2210/41* (2013.01); *G06T 2219/2004* (2013.01); *G06T 2219/2016* (2013.01); *H04S 2400/11* (2013.01)

(58) Field of Classification Search
CPC ...................................... G06T 15/08
USPC ........................................ 348/424
See application file for complete search history.

(56) References Cited

U.S. PATENT DOCUMENTS

| | | | | |
|---|---|---|---|---|
| 5,271,401 | A * | 12/1993 | Fishman | A61B 6/507 424/9.4 |
| 5,412,703 | A * | 5/1995 | Goodenough | G01N 23/046 378/4 |
| 5,535,747 | A * | 7/1996 | Katakura | A61B 8/04 600/438 |
| 6,847,336 | B1 * | 1/2005 | Lemelson | G16H 20/40 345/8 |
| 8,384,771 | B1 * | 2/2013 | Douglas | H04N 13/117 348/53 |
| 9,349,183 | B1 * | 5/2016 | Douglas | H04N 13/275 |
| 2002/0048343 | A1 * | 4/2002 | Launay | A61B 6/504 378/98.12 |
| 2005/0017972 | A1 * | 1/2005 | Poole | A61B 8/461 345/424 |
| 2005/0168461 | A1 * | 8/2005 | Acosta | G06T 15/08 345/419 |
| 2006/0178580 | A1 * | 8/2006 | Nakamura | G06K 9/00067 600/438 |
| 2006/0181482 | A1 * | 8/2006 | Iaquinto | A61B 90/36 345/8 |
| 2006/0241458 | A1 * | 10/2006 | Hayashi | A61B 8/06 600/453 |

(Continued)

*Primary Examiner* — Leron Beck

(57) ABSTRACT

In this patent, we teach a method and apparatus for displaying flow-type visualization features that move in accordance with fluid dynamics models on extended reality displays. A user is able to select the type of flow of interest and the type of flow of non-interest and then display the type of flow of interest unhindered by the type of flow of non-interest. This technique has applications in medicine, such as modeling flow inside of the carotid artery. Also, outside of the medical field, this technique can have applications, such as in aeronautical engineering.

22 Claims, 22 Drawing Sheets

(56) References Cited

U.S. PATENT DOCUMENTS

| | | | |
|---|---|---|---|
| 2007/0263915 A1* | 11/2007 | Mashiach | G06K 9/4638 |
| | | | 382/130 |
| 2010/0081912 A1* | 4/2010 | McKenna | A61B 5/02007 |
| | | | 600/368 |
| 2011/0196237 A1* | 8/2011 | Pelissier | A61B 8/467 |
| | | | 600/454 |
| 2011/0257561 A1* | 10/2011 | Gertner | A61B 5/4893 |
| | | | 601/2 |
| 2013/0188848 A1* | 7/2013 | Helm | A61B 6/5258 |
| | | | 382/131 |
| 2013/0230224 A1* | 9/2013 | Claude | A61B 5/055 |
| | | | 382/131 |
| 2014/0307067 A1* | 10/2014 | Douglas | H04N 13/363 |
| | | | 348/53 |
| 2015/0379351 A1* | 12/2015 | Dibenedetto | A61B 5/6803 |
| | | | 345/633 |
| 2018/0047304 A1* | 2/2018 | Sankaran | G09B 23/303 |
| 2018/0116728 A1* | 5/2018 | Lang | A61B 17/1764 |
| 2018/0168740 A1* | 6/2018 | Ryan | A61B 34/25 |
| 2019/0057555 A1* | 2/2019 | Gallop | G06T 19/20 |

\* cited by examiner

A

B

3D IMAGING OF VIRTUAL FLUIDS AND VIRTUAL SOUNDS

TECHNICAL FIELD

Aspects of this disclosure are generally related to radiological imaging, and more particularly to the appearance of mobile fluids wearing extended reality headsets.

BACKGROUND

One of the challenges that physicians face when viewing a volume with an augmented reality, virtual reality or mixed reality headset is visualization of blood flow.

SUMMARY

All examples, aspects and features mentioned in this document can be combined in any technically possible way.

In accordance with some implementations a method of denoting blood flow within a 3D volume on a head display unit (HDU), comprises: generating a 3D volumetric dataset containing at least one blood vessel; generating at least one pointer; determining the direction of blood flow; modifying the 3D volumetric dataset by placing the at least one pointer in proximity to the at least one blood vessel in a direction aligned with a direction of blood flow; displaying, in said HDU, a left eye image based on said modified 3D volumetric dataset and a right eye image based on said modified 3D volumetric dataset, wherein said left eye image and said right eye image are alternate three-dimensional images; and displaying, in said HDU, the at least one pointer advancing in the direction of blood flow. In some implementations placing the at least one pointer in proximity to the at least one blood vessel comprises placing a 2D arrow. In some implementations placing the at least one pointer in proximity to the at least one blood vessel comprises placing a 3D arrow. Some implementations comprise displaying, in said HDU, the pointer with changing color. Some implementations comprise displaying, in said HDU, the pointer advancing in the direction of blood flow faster in arteries than veins.

An important way to understand flow over a surface in aerodynamics or fluid dynamics is direct observation of the flow fields. A method and apparatus for displaying mobile fluids stereoscopically in a realistic fashion will be taught. Specifically, this technique will be useful in many fields. For example, in aeronautical engineering, this technique can be useful for viewing 3D models of airflow over a surface. In medicine, this technique can be useful for viewing 3D models of blood flow in the carotid arteries. For example, many neuroradiologists currently use NASCET criteria to determine management strategies, but the process in this patent may help in stratify risk and improving management strategies.

Some embodiments comprise: generation of a 3D volumetric dataset; generating an image for left eye based on the left eye view point, the left eye viewing angle and the 3D imaging volume and an image for the right eye based on the right eye view point, the right eye viewing angle and the 3D imaging volume wherein a user viewing the left eye image and right eye image on an extended reality headset (e.g., augmented reality, virtual reality, mixed reality, etc.) sees a 3D image; determining the 3D flow model using fluid dynamics models; modifying the 3D volumetric dataset by inserting or moving flow-type visualization feature(s) (e.g., mobile point cloud, mobile voxels, mobile growing lines, mobile growing volume subtending objects) in accordance with the fluid dynamics model; then, generating an image for left eye based on the left eye view point, the left eye viewing angle and the 3D imaging volume and an image for the right eye based on the right eye view point, the right eye viewing angle and the 3D imaging volume wherein a user viewing the left eye image and right eye image on an extended reality headset (e.g., augmented reality, virtual reality, mixed reality, etc.) sees a 3D image. It is important to note that this process is performed in real time at a frame rate fast enough to account for the user's movements of head position, eye movements, and any other factors. Thus, as long as the fluid is moving, the volume is rendered over and over again. Such a model would be useful in presenting to the user the flow-type visualization features in an understandable fashion with adjustable rates. Standard fluid kinetics models, such as the pressure difference between the two ends of a pipe is equal to the product of eight times the dynamic viscosity times the length of the pipe times the volumetric flow rate divided by pi times the radius to the fourth power, can be utilized for flow models.

Some embodiments include segmenting the flow-type visualization features into different types of flow based on flow parameters. Example flow patterns include laminar or turbulent flow. Other examples of segmentation include, but are not limited to the following: speed; direction; proximity to structures of interest; or combination thereof.

Some embodiments of the flow-type visualization feature include, but are not limited to the following: a mobile point cloud; mobile lines; mobile voxels; mobile growing volume subtending objects.

Some embodiments of the flow-type visualization feature include, but are not limited to the following: varying colors; varying brightness; varying textures; varying shapes; varying sizes; varying speeds of movement; and varying directions of movement.

Some embodiments of the flow type visualization feature include moving through 3D space in accordance with fluid dynamic models. Other embodiments of the flow type visualization feature include moving through 3D space in accordance with the aerodynamic models.

Some embodiments include wherein the 3D volumetric dataset changes in real time and the flow-type visualization features are correspondingly altered. This would give the user the ability to understand and visualize the effects of changes in the volume on the air flow. For example, if the carotid atherosclerotic plaque were narrowed, viewing these models would show the user how the flow changes. An alternative example would be adjusting the angle of attack of a virtual wing and watching the flow-type visualization feature correspondingly change based on the predicted models while during true 3D stereoscopic viewing with an extended reality headset.

Some embodiments include changing the properties of gas of fluid and the flow-type visualization feature is correspondingly altered. And example would be to change the viscosity of blood and then visualize changes in the 3D blood flow An alternative example would be to change the temperature or humidity of the air and then visualize changes in the 3D air flow.

Some embodiments comprise selecting a set of tangible tools; generation of a 3D volumetric dataset; perform georegistration of the tangible tools with the 3D volumetric dataset; modify the 3D volumetric dataset by inserting sound-type visualization feature; and display, in a head display unit (HDU), an image for left eye based on the left eye view point, the left eye viewing angle and the modified 3D imaging volume and an image for the right eye based on the right eye view point, the right eye viewing angle and the modified 3D imaging volume wherein a user viewing the left eye image and right eye image sees a 3D image. Some embodiments comprise wherein the tangible tools are musical instruments, such as guitars, pianos, violins, etc.

Some embodiments comprise updating position and orientation data of the tangible tools; determining the flow direction that sound would move in accordance with acoustic models; and moving mobile sound-type visualization feature such that the 3D imaging volume is modified a subsequent time.

Some embodiments comprise wherein the sound-type visualization features is at least one of the group of mobile point cloud, mobile voxels, mobile growing lines, and mobile growing volume subtending objects.

Some embodiments comprise wherein the sound-type visualization features are segmented by properties. For example, segmentation can be performed based on amplitude or frequency.

Some embodiments comprise wherein the sound-type visualization features are filtered.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Some aspects, features and implementations described herein may include machines such as computers, electronic components, radiological components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

Figure 1:
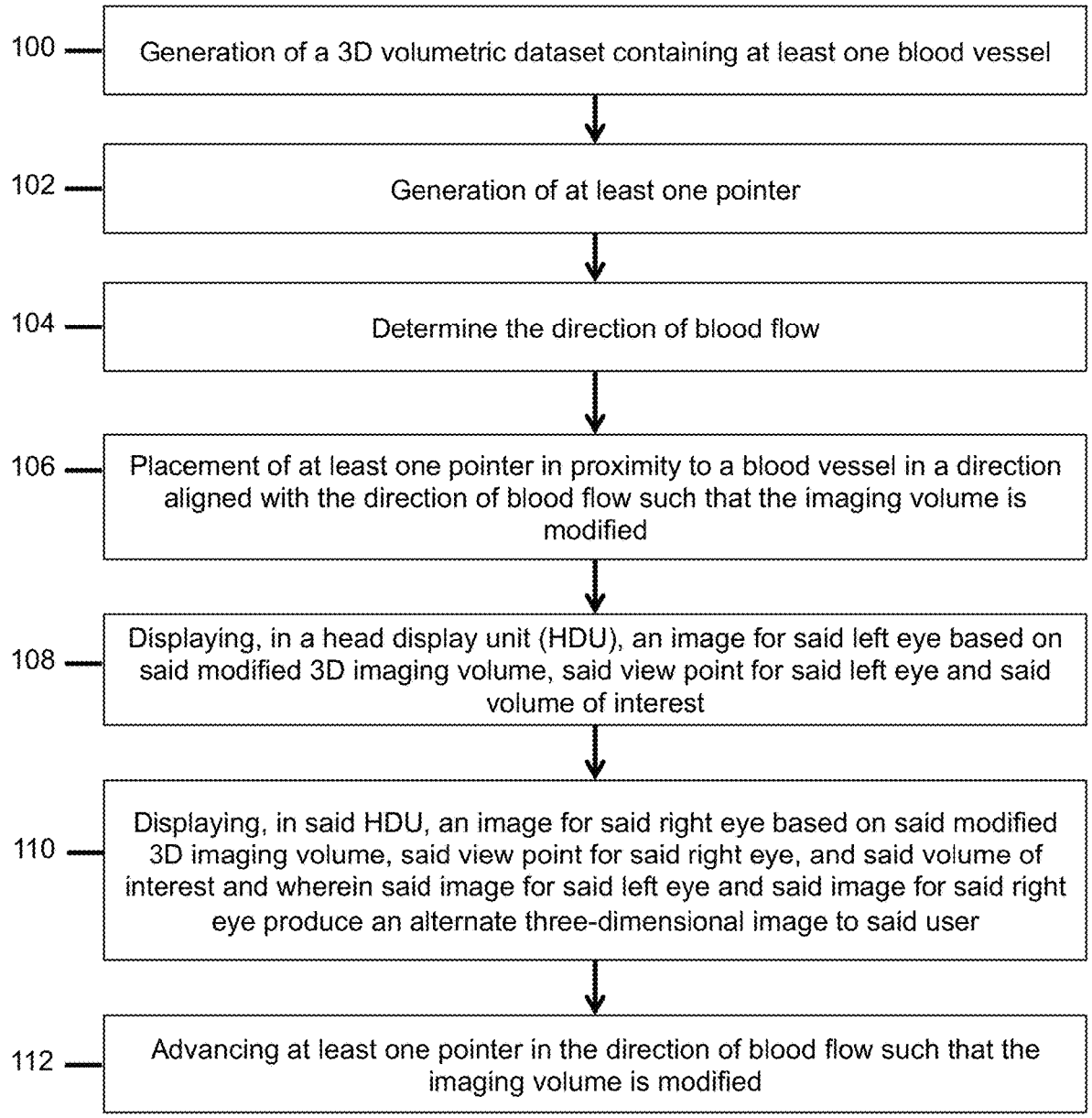
FIG. 1 illustrates the method for using pointers to denote blood flow direction within a 3D volumetric dataset and viewing with a head display unit.

FIG. 1 illustrates an implementation of a method for using pointers to denote blood flow direction within a 3D volumetric dataset and viewing with a head display unit. In the first step 100, a 3D volumetric dataset containing at least one blood vessel is generated. In the second step 102, at least one pointer is generated. In the third step 104, the direction of blood flow is determined. In the fourth step 106, at least one pointer in proximity to a blood vessel in a direction aligned with the direction of blood flow is placed such that the 3D volumetric dataset is modified. In the fifth step 108, an image for said left eye based on said modified 3D imaging volume, said view point for said left eye and said volume of interest is displayed, in the left eye display of the said HDU. In the sixth step 110, an image for said right eye based on said modified 3D imaging volume, said view point for said right eye, and said volume of interest and wherein said image for said left eye and said image for said right eye produce an alternate three-dimensional image to said user. In the seventh step 112, at least point pointer is advanced in the direction of blood flow such that the imaging volume is modified. Some portions of this process can be repeated such that multiple modified 3D imaging volumes are created and displayed on the HDU. This would serve to provide the visualization of moving arrows and help the imager better understand blood flow.

Figure 2:
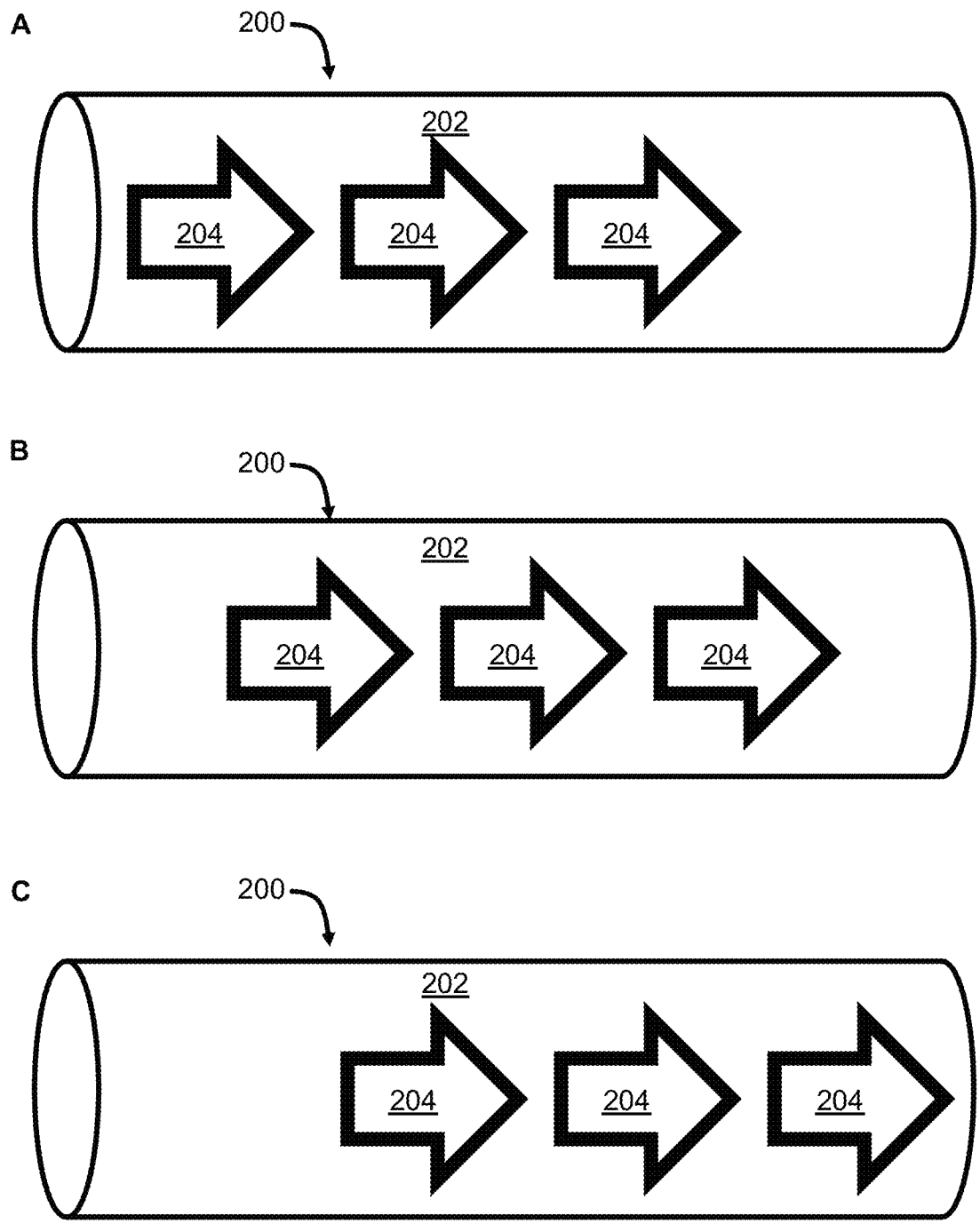
FIG. 2 illustrates advancing pointers to depict the direction of the blood flow.

FIG. 2 illustrates advancing pointers (or arrows) to depict the direction of the blood flow. In the human body, it is common for blood in most arteries to be directed away from the heart and for blood in most veins to be directed towards the heart. However, in some situations in the body (e.g., subclavian steal with retrograde flow in the vertebral artery), this rule does not apply. It can be difficult for even an experienced imager to readily determine which structures are arteries and which structures are veins. Additionally, even if an imager is able to identify a structure as an artery, it can be difficult to determine its orientation without carefully tracing it back to its origin. Through advances in computer processing, these vessels and the direction of blood flow therein can be determined. An effective visual representation method is required. In this method, advancing pointers along an artery can be performed to indicate the direction of blood flow. Similarly, advancing pointers can be performed in a vein. The color of the pointers can be changed to designate to the user whether it is an artery or vein. Further, the rate of advance of the pointers can also be varied, such as to match the natural blood flow rate for a realistic understanding of the hemodynamics of the patient. The pointers could be located in close proximity to (or within the blood vessels, such as within the center of the blood vessel). As a blood vessel curves through the 3D volume space, the path of the pointers would also curve to match that of the normal blood flow. In FIG. 2A, the pointers 204 are shown within the blood vessel lumen 202 in an initial position with respect to the blood vessel wall 200 and position of the remainder of structures within the imaging volume, which are not shown. This would represent the appearance of the imaging volume at an initial time point. In FIG. 2B, the pointers 204 are shown within the blood vessel lumen 202 in an second, slightly advanced position with respect to the blood vessel wall 200 and position of the remainder of structures within the imaging volume, which are not shown. This would represent the appearance of the imaging volume at a subsequent time point. In FIG. 2C, the pointers 204 are shown within the blood vessel lumen 202 in an third, even further advanced position with respect to the blood vessel wall 200 and position of the remainder of structures within the imaging volume, which are not shown. This would represent the appearance of the imaging volume at an additional subsequent time point. The volume that would displayed to the user on an extended reality (i.e., augmented reality, mixed reality or virtual reality headset) would therefore be dynamic and change over time. Even if the user were looking at a particular structure without moving his or her head, some items within the 3D volume would appear to be moving.

Figure 3:
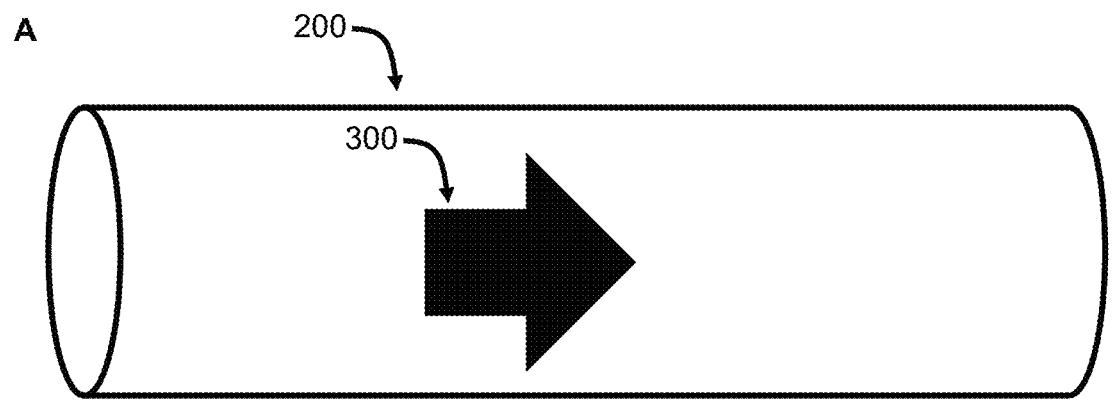
FIG. 3 illustrates placement of a 2D pointer into the 3D volume.
Figure 3:
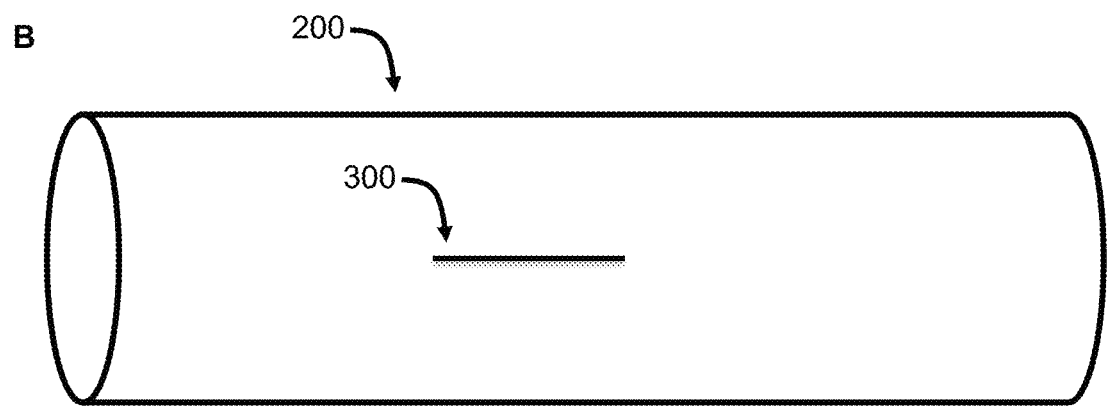

FIG. 3 illustrates placement of a 2D pointer into the 3D volume. In FIG. 3A, a 2D pointer 300 is placed into the blood vessel 200 within the 3D imaging volume. Note that this image illustrates a side view wherein the user's left and right eye view points and left and right eye viewing angles show the side of the 2D pointer 300 and the side of the blood vessel 200 within the 3D volume. In FIG. 3B, the 2D pointer 300 is placed into the blood vessel 200 within the 3D volume. Note that this image illustrates a top down view wherein the user's left and right eye view points and left and right eye viewing angles show the 2D pointer 300 and the top of the blood vessel 200 within the 3D volume. Note that since the 2D pointer is a planar slice, it nearly disappears when viewing from a near top position. A true top position with a planar 2D slice would completely disappear unless the 2D arrow was reoriented. Non-planar slices could also be used, which would be seen from any viewing angle and could be beneficial for viewing direction of blood on a curved vessel.

Figure 4:
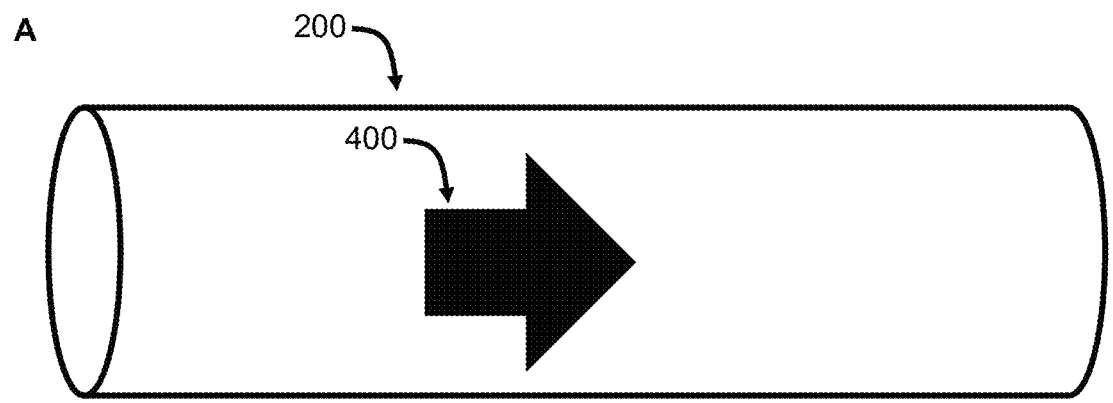
FIG. 4 illustrates placement of a 3D pointer into the 3D volume.
Figure 4:
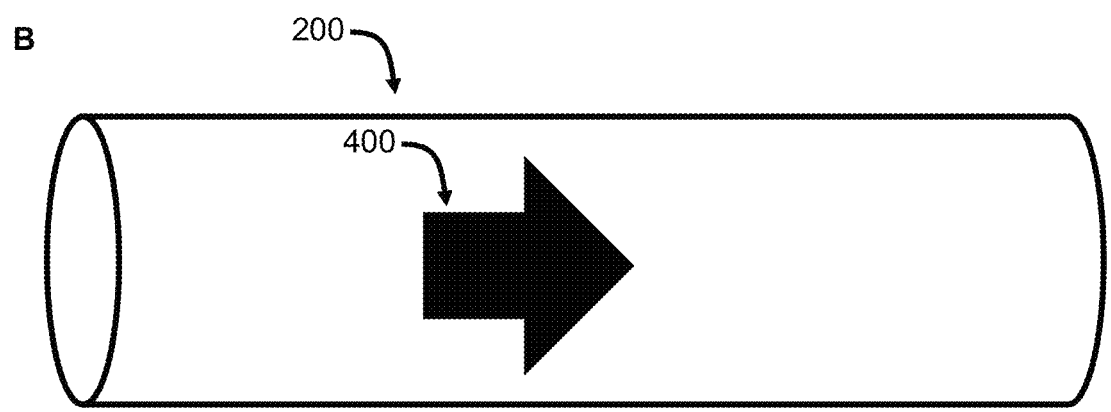

FIG. 4 illustrates placement of a 3D pointer into the 3D volume. In FIG. 4A, a 3D pointer 400 is placed into the blood vessel 200 within the 3D imaging volume. Note that this image illustrates a side view wherein the user's left and right eye view points and left and right eye viewing angles show the side of the 3D pointer 400 and the side of the blood vessel 200 within the 3D volume. In FIG. 4B, the 3D pointer 400 is placed into the blood vessel 200 within the 3D volume. Note that this image illustrates a top down view wherein the user's left and right eye view points and left and right eye viewing angles show the 3D pointer 400 and the top of the blood vessel 200 within the 3D volume. Note that since the pointer is 3D, it is clearly visualized when viewing from a near top position. Such a pointer could be constructed by arranging a series of 2D non-planar slices to form a cone abutting a cylinder (also made of combination of planar and non-planar slices) yielding a 3D pointer 400. By inserting this into the 3D volume, the volume would be modified.

Figure 5:
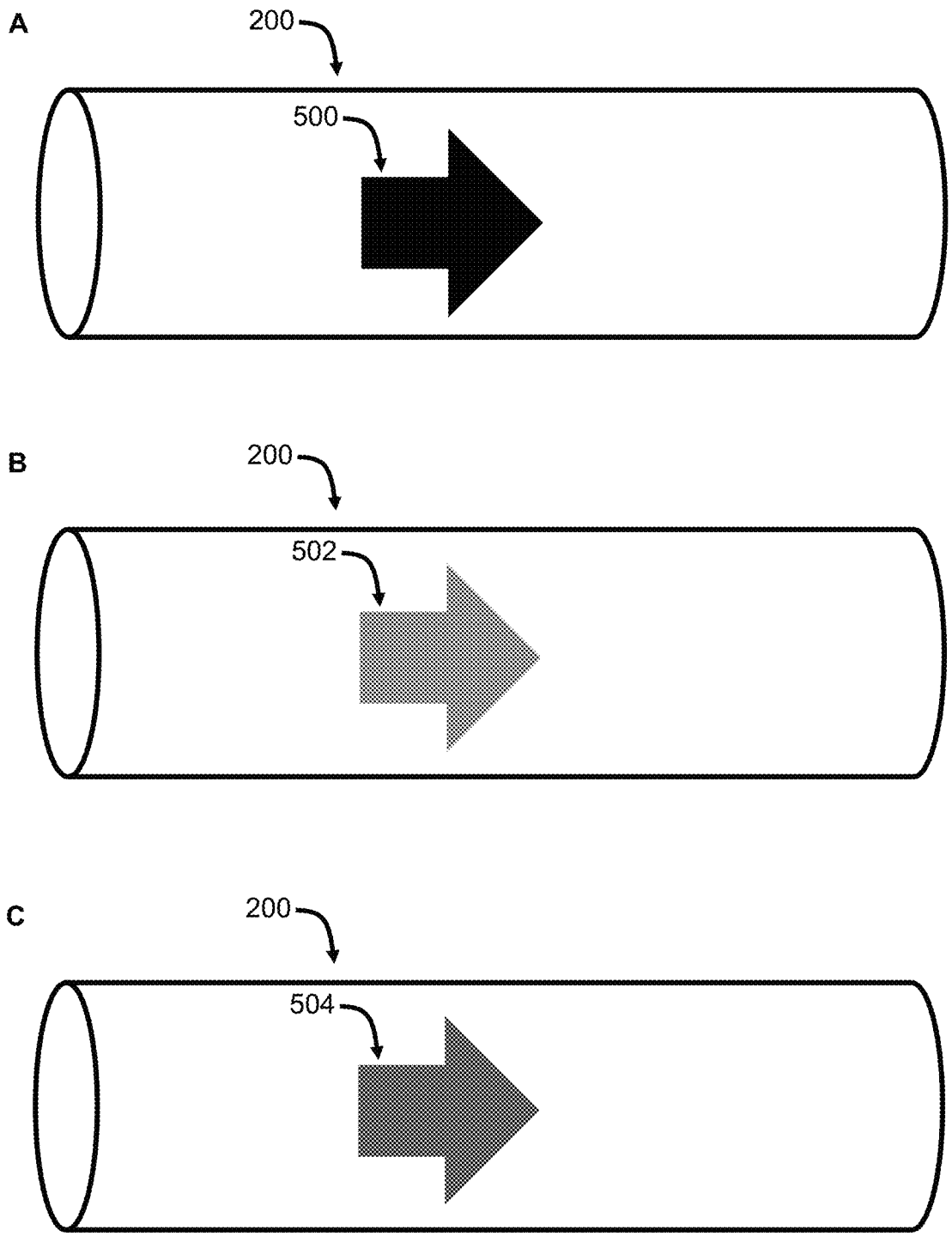
FIG. 5 illustrates placement of a 3D pointer into the 3D volume wherein the appearance of the 3D pointer can be modified.

FIG. 5 illustrates placement of a 3D pointer into the 3D volume wherein the appearance of the 3D pointer can be modified. In FIG. 5A, a 3D pointer 500 is placed into the blood vessel 200 within the 3D volume. Note that the appearance of the 3D pointer 500 is black. In FIG. 5B, the 3D pointer 502 is placed into the blood vessel 200 within the 3D volume. Note that the appearance of the 3D pointer 502 is gray. In FIG. 5C, a 3D pointer 504 is placed into the blood vessel 200 within the 3D volume. Note that the appearance of the 3D pointer 504 is red. Note that the appearance of the pointer can vary. It can be 2D or 3D. It can be a wide range of colors. It can be a wide range of shapes. It can have a wide range of textures.

Figure 6:
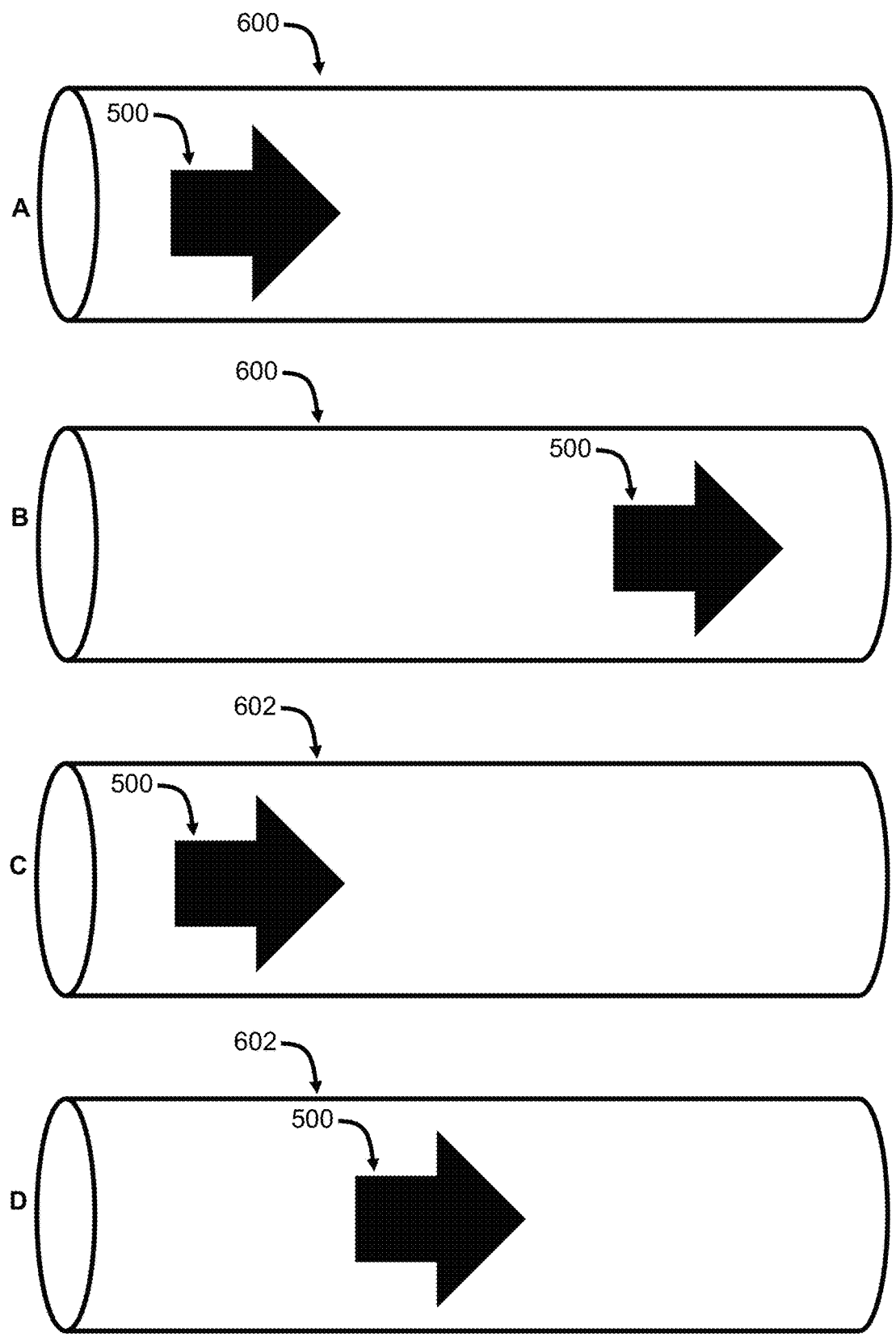
FIG. 6 illustrates variable pointer rates of movement.

FIG. 6 illustrates variable pointer rates of movement. In FIG. 6A, the black 3D pointer 500 is located within the proximal portion of an artery 600 at time point=x. In FIG. 6B, the black 3D pointer 500 has moved and is located distally towards the end of the artery 600 at time point=x+n. In FIG. 6C, the pointer 500 is located within the distal portion of a vein 602 at time point=x. In FIG. 6D, the pointer 500 is located with the mid portion of the vein 602 at time point=x+n. Note that the 3D pointer 500 is moving faster in the artery 600 as compared to the vein 602.

Figure 7:
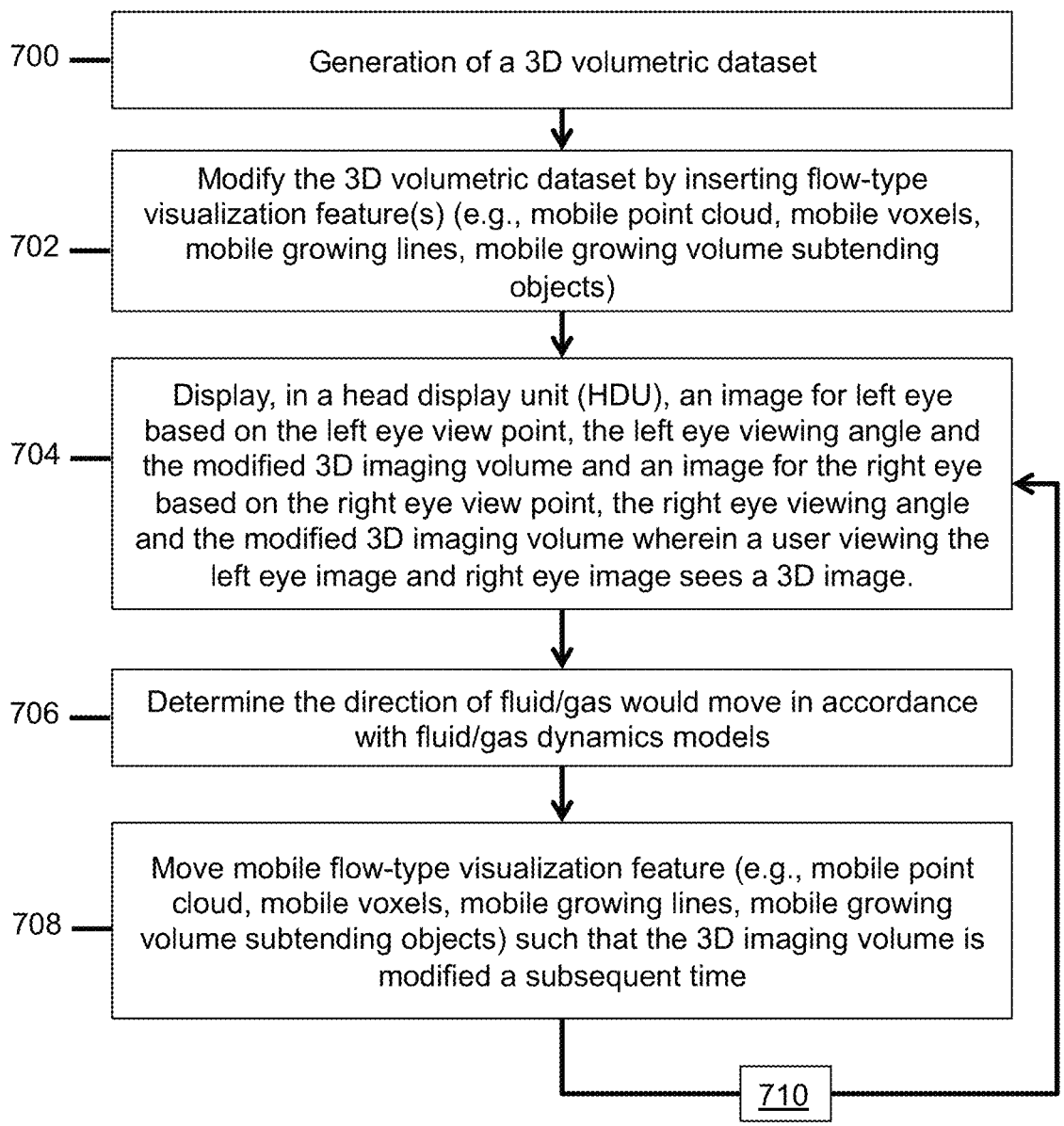
FIG. 7 illustrates the method for 3D visualization of fluids moving within a 3D volumetric dataset and viewing with a head display unit.

FIG. 7 illustrates the method for 3D visualization of fluids moving within a 3D volumetric dataset and viewing with a head display unit. The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, Such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order. Step 700 is to generate a 3D volumetric dataset. An example of this could be by building a volumetric dataset from cross-sectional imaging examinations (e.g., CT or MRI scans). Another example would be to build a 3D volumetric dataset through software platforms such as Unity or Unreal Engine. Step 702 is to modify the 3D volumetric dataset by inserting flow-type visualization feature(s) (e.g., mobile point cloud, mobile voxels, mobile growing lines, mobile growing volume subtending objects). Step 704 is to display, in a head display unit (HDU), an image for left eye based on the left eye view point, the left eye viewing angle and the modified 3D imaging volume and an image for the right eye based on the right eye view point, the right eye viewing angle and the modified 3D imaging volume wherein a user viewing the left eye image and right eye image sees a 3D image. Step 706 is to determine the direction of fluid in accordance with fluid dynamics models. Step 708 is to move mobile flow-type visualization feature (e.g., mobile point cloud, mobile voxels, mobile growing lines, mobile growing volume subtending objects) such that the 3D imaging volume is modified a subsequent time. Step 710 is to return to the third step 704. It is important to note that this process is performed in real time at a frame rate fast enough to account for the user's movements of head position, eye movements, and any other factors. Thus, as long as the fluid is moving, the volume is rendered over and over again. A stop, rewind, slow motion, or fast forward command could also be implemented.

Figure 8:
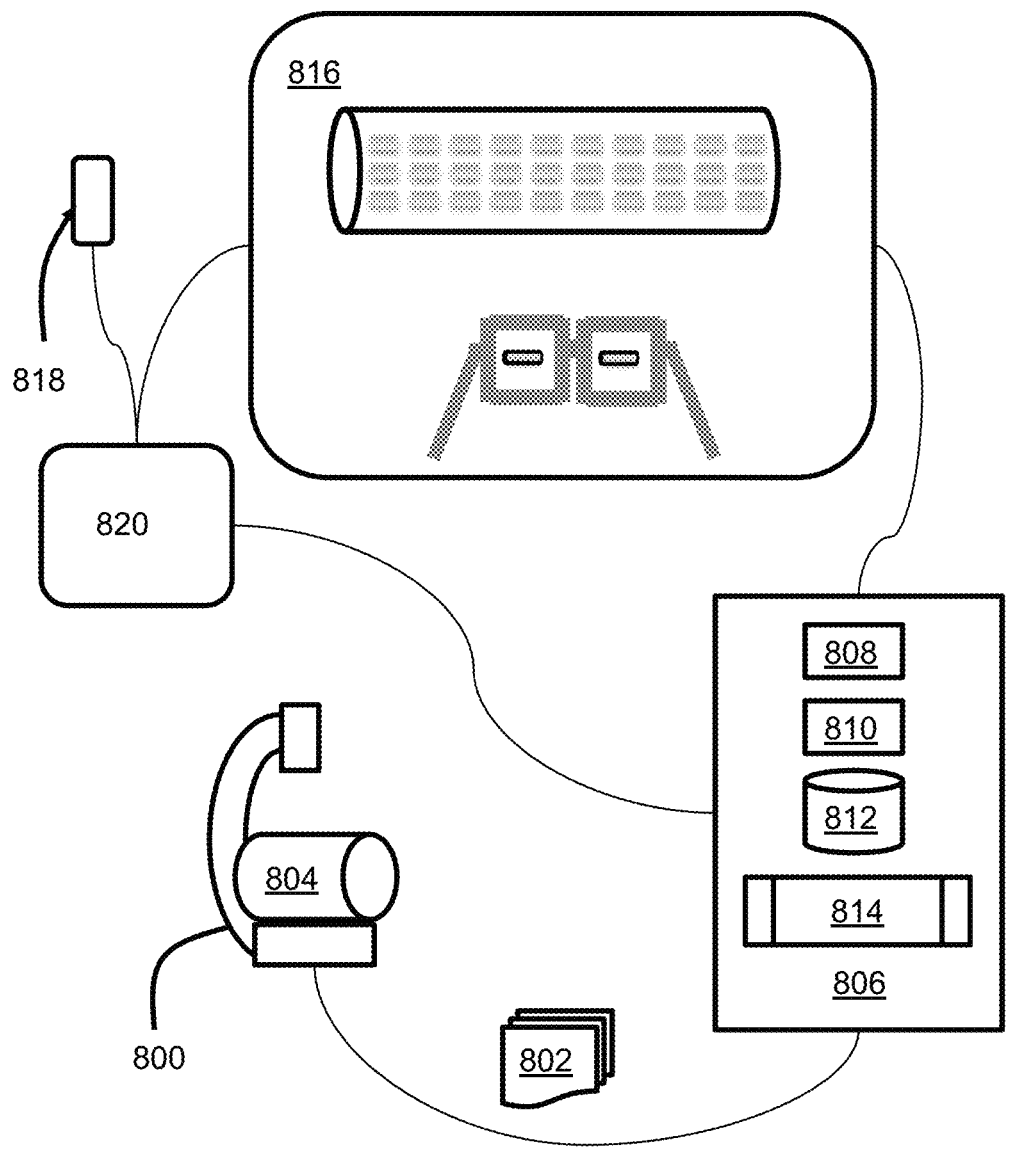
FIG. 8 illustrates an apparatus.

FIG. 8 illustrates an apparatus. A radiologic imaging system 800 (e.g., X-ray, ultrasound, CT (computed Tomography), PET (Positron Emission Tomography), or MRI (Magnetic Resonance Imaging)) is used to generate 2D medical images 802 of an anatomic structure 804 of interest. The 2D medical images 802 are provided to an image processor 806, that includes processors 808 (e.g., CPUs and GPUs), volatile memory 810 (e.g., RAM), and non-volatile storage 812 (e.g. HDDs and SSDs). A program 814 running on the image processor implements one or more of the steps described in FIG. 7. 3D medical images are generated from the 2D medical images and displayed on an IO device 816. The IO device 816 may include a virtual reality headset, mixed reality headset, augmented reality headset, monitor, tablet computer, PDA (personal digital assistant), mobile phone, or any of a wide variety of devices, either alone or in combination. The IO device 816 may include a touchscreen, and may accept input from external devices (represented by 818) such as a keyboard, mouse, and any of a wide variety of equipment for receiving various inputs. However, some or all the inputs could be automated, e.g. by the program 814.

Figure 9A:
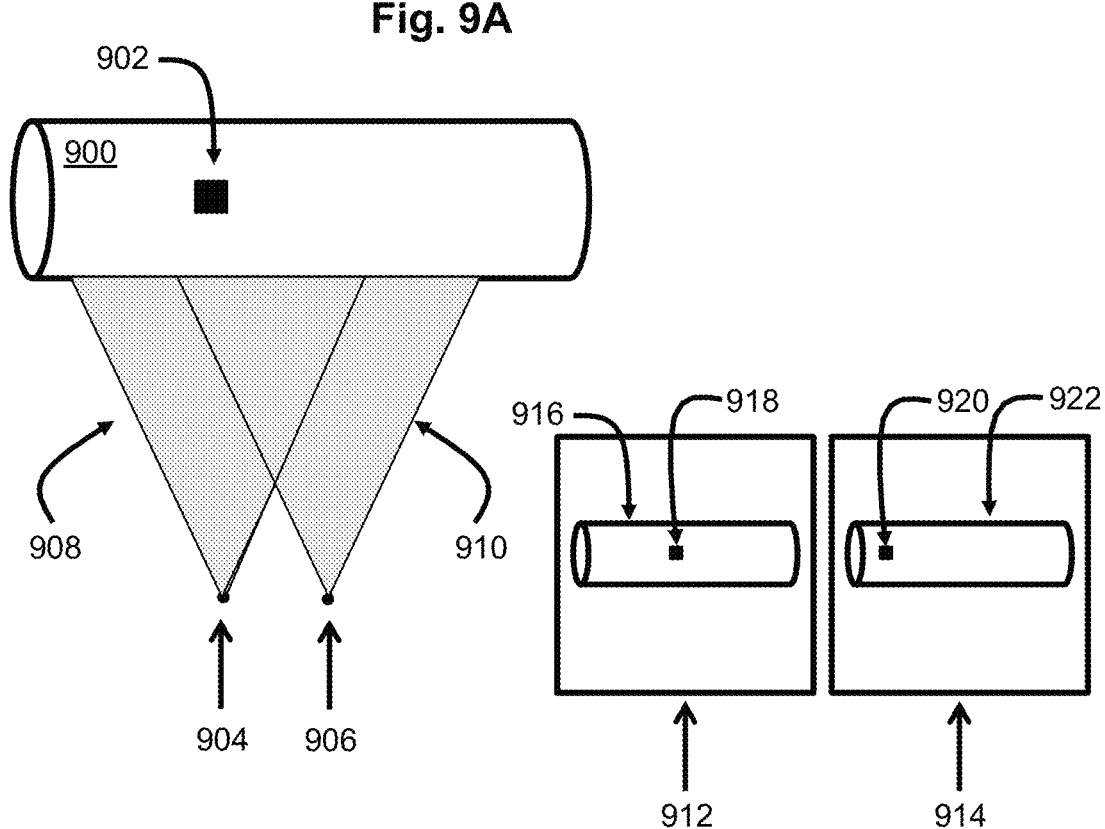
FIG. 9A illustrates the stereoscopic rendering process of a mobile fluid at a first time point where fluid is at an initial position.

FIG. 9A illustrates the stereoscopic rendering process of a mobile fluid at a first time point where fluid is at an initial position. A cylinder shaped pipe is shown in 900. A fluid-type visualization feature 902 is shown at a first position. The left eye view point 904, left eye viewing angle 908, right eye view point 906 and right eye viewing angle 910 are shown. A left eye image 912 shows the cylinder shaped pipe 916 and the fluid-type visualization feature 918. Note that the left eye image 912 is generated from the left eye view point 904, left eye viewing angle 908 and the volume of interest comprising the cylinder shaped pipe 900 and the fluid-type visualization feature 902. A right eye image 914 shows the cylinder shaped pipe 920 and the fluid-type visualization feature 922. Note that the right eye image 914 is generated from the right eye view point 906, right eye viewing angle 910 and the volume of interest comprising the cylinder shaped pipe 900 and the fluid-type visualization feature 902.

Figure 9B:
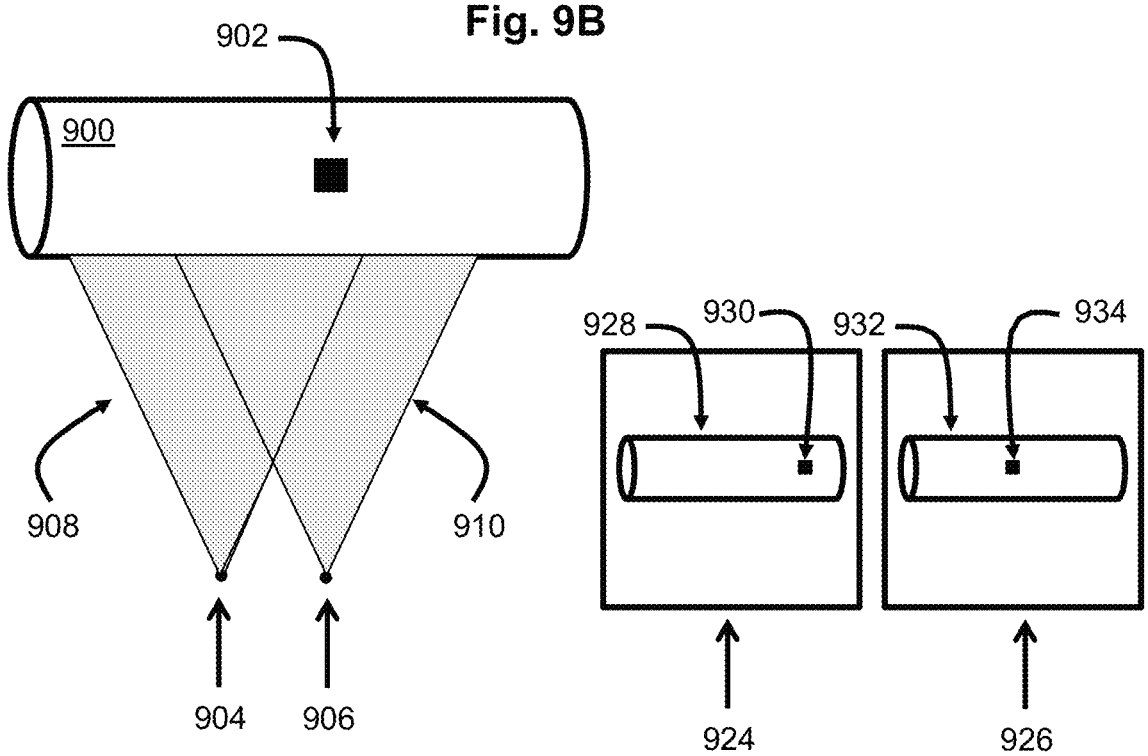
FIG. 9B illustrates the stereoscopic rendering process of a mobile fluid at a second time point where fluid is at a subsequent position.

FIG. 9B illustrates the stereoscopic rendering process of a mobile fluid at a second time point where fluid is at a subsequent position. A cylinder shaped pipe is shown in 900. A fluid-type visualization feature 902 is shown at a second position. The left eye view point 904, left eye viewing angle 908, right eye view point 906 and right eye viewing angle 910 are shown. A second left eye image 924 shows the cylinder shaped pipe 928 and the fluid-type visualization feature 930. Note that the left eye image 924 is generated from the left eye view point 904, left eye viewing angle 908 and the volume of interest comprising the cylinder shaped pipe 900 and the fluid-type visualization feature 902. A right eye image 926 shows the cylinder shaped pipe 932 and the fluid-type visualization feature 934. Note that the right eye image 926 is generated from the right eye view point 906, right eye viewing angle 910 and the volume of interest comprising the cylinder shaped pipe 900 and the fluid-type visualization feature 902.

Figure 10A:
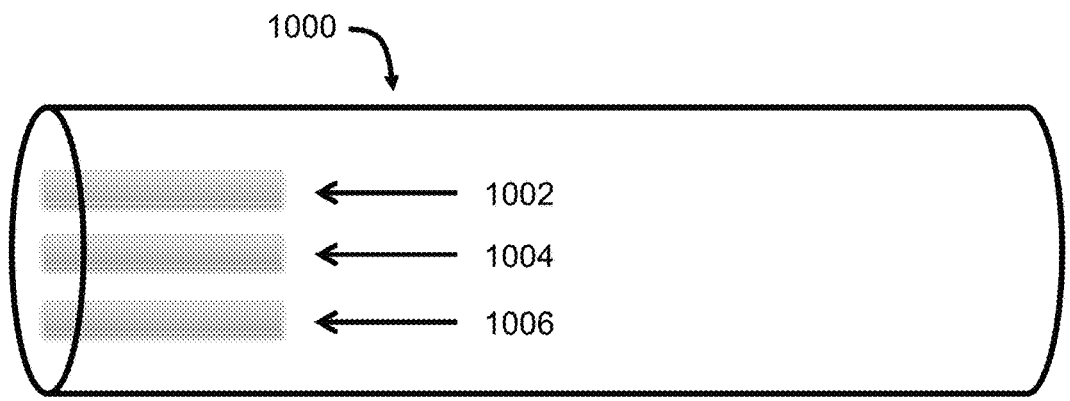
FIG. 10A illustrates growing 3D objects moving through the pipe to illustrate fluid movement at a first time point with the 3D objects at an initial length and volume.

FIG. 10A illustrates growing 3D objects moving through the pipe to illustrate fluid movement at a first time point with the 3D objects at an initial length and volume. The side view (from the left and right eye view points, not shown) of a pipe 1000 is shown. A first fluid-type visualization feature 1002 is shown at the top at an initial length and volume. A second fluid-type visualization feature 1004 is shown at the middle at an initial length and volume. A third fluid-type visualization feature 1006 is shown at the bottom at an initial length and volume.

Figure 10B:
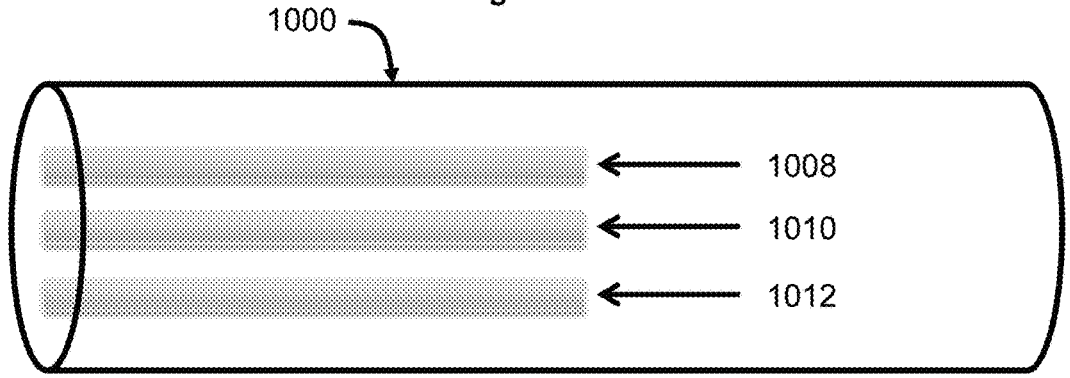
FIG. 10B illustrates growing 3D objects moving through the pipe to illustrate fluid movement at a subsequent time point with the 3D objects at a longer length and larger volume.

FIG. 10B illustrates growing 3D objects moving through the pipe to illustrate fluid movement at a subsequent time point with the 3D objects at a longer length and larger volume. The first fluid-type visualization feature 1008 is shown at the top at a subsequent longer length and larger volume (compare with FIG. 10A). The second fluid-type visualization feature 1010 is shown at the middle at a subsequent longer length and larger volume (compare with FIG. 10A). The third fluid-type visualization feature 1012 is shown at the bottom at a subsequent longer length and larger volume (compare with FIG. 10A).

Figure 10C:
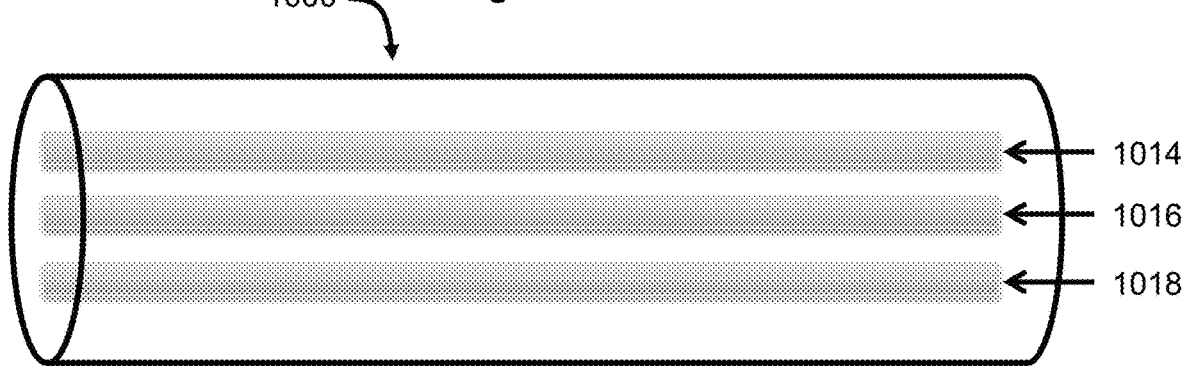
FIG. 10C illustrates growing 3D objects moving through the pipe to illustrate fluid movement at a an additional subsequent time point with the 3D objects at an even longer length and larger volume.

FIG. 10C illustrates growing 3D objects moving through the pipe to illustrate fluid movement at an additional subsequent time point with the 3D objects at an even longer length and larger volume. The side view (from the left and right eye view points, not shown) of a pipe 1000 is shown. The first fluid-type visualization feature 1014 is shown at the top at a subsequent even longer length and larger volume (compare with FIG. 10B). The second fluid-type visualization feature 1016 is shown at the middle at a subsequent longer length and larger volume (compare with FIG. 10B). The third fluid-type visualization feature 1018 is shown at the bottom at a subsequent longer length and larger volume (compare with FIG. 10B).

Figure 11A:
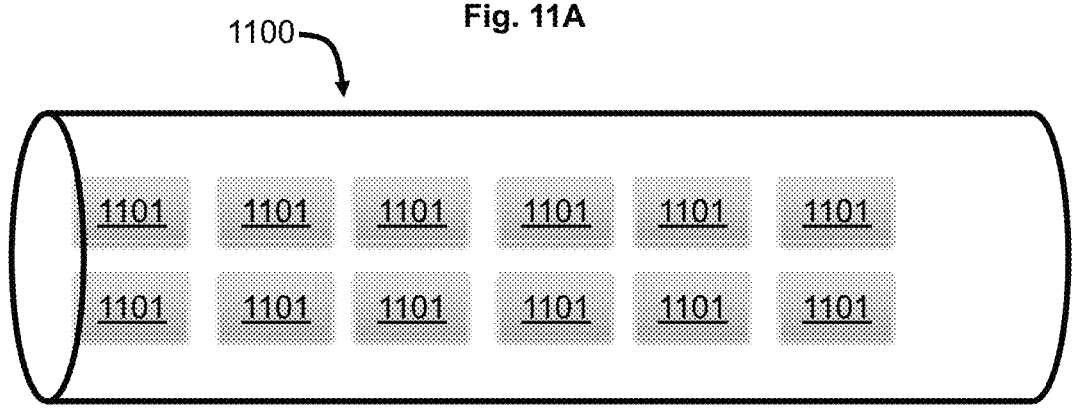
FIG. 11A illustrates multiple 3D objects moving through the pipe to illustrate fluid movement at a first time point with the 3D objects at an initial position.

FIG. 11A illustrates multiple 3D objects moving through the pipe to illustrate fluid movement at a first time point with the 3D objects at an initial position. Twelve 3D objects 1101 at an initial position with respect to the pipe 1100.

Figure 11B:
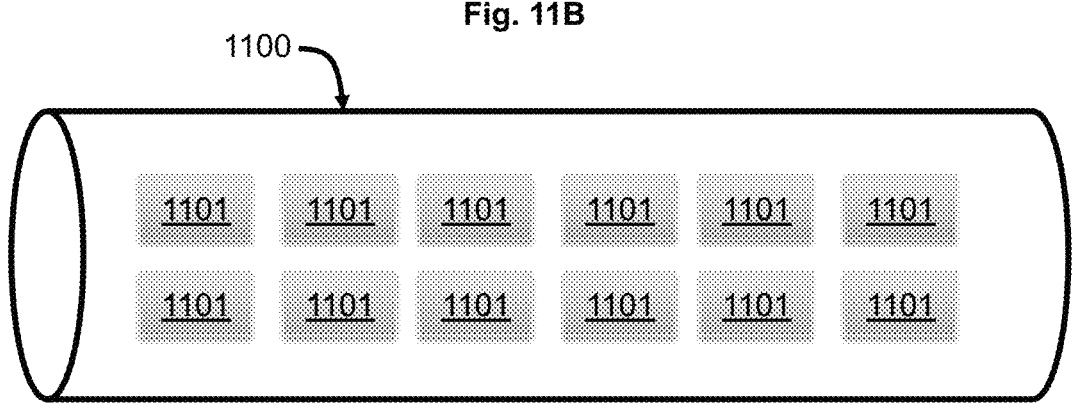
FIG. 11B illustrates multiple 3D objects moving through the pipe to illustrate fluid movement at a subsequent time point with the 3D objects at a subsequent position.

FIG. 11B illustrates multiple 3D objects moving through the pipe to illustrate fluid movement at a subsequent time point with the 3D objects at a subsequent position. The twelve 3D objects 1101 at an subsequent position with respect to the pipe 1100.

Figure 11C:
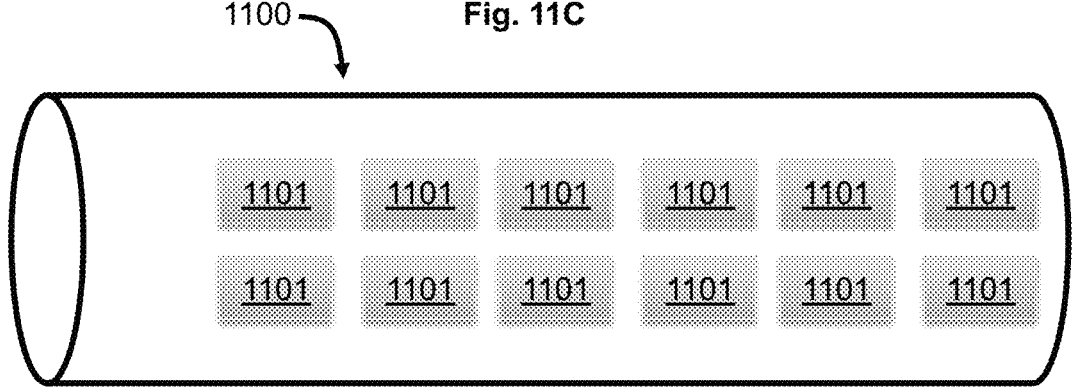
FIG. 11C illustrates multiple 3D objects moving through the pipe to illustrate fluid movement at a additional subsequent time point with the 3D objects at an additional subsequent position.

FIG. 11C illustrates multiple 3D objects moving through the pipe to illustrate fluid movement at a additional subsequent time point with the 3D objects at an additional subsequent position. The twelve 3D objects 1101 at an additional subsequent position with respect to the pipe 1100. At each new time point, the extended reality head display unit (HDU) will show a new 3D imaging volume. Thus, some elements in the volume will appear stationary. Other elements in the volume will appear moving. The preferred embodiment to show the movement is in accordance with fluid dynamic models.

Figure 12A:
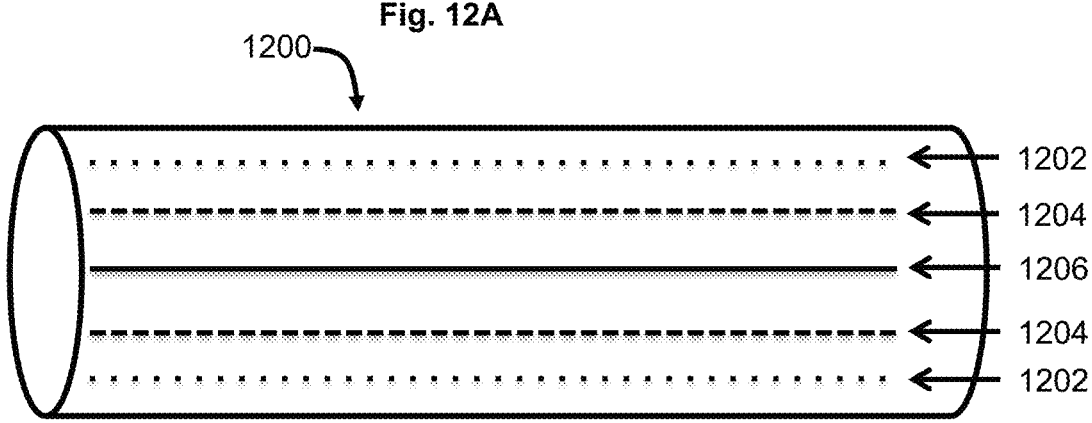
FIG. 12A illustrates multiple 3D objects moving through the pipe to illustrate fluid movement comprising multiple types of 2D lines.

FIG. 12A illustrates multiple 3D objects moving through the pipe to illustrate fluid movement comprising multiple types of 2D lines. Laminar flow is in such a fashion that the flow in the center of a pipe is faster than the flow at the periphery of the pipe. This can be visualized by using differing 3D objects. A pipe 1200 (or blood vessel section) is shown. Two dotted lines 1202 are illustrated to represent the slowest flow. Two dashed lines 1204 are illustrated to represent the intermediate flow rate. A solid line 1206 is illustrated to represent the fastest flow.

Figure 12B:
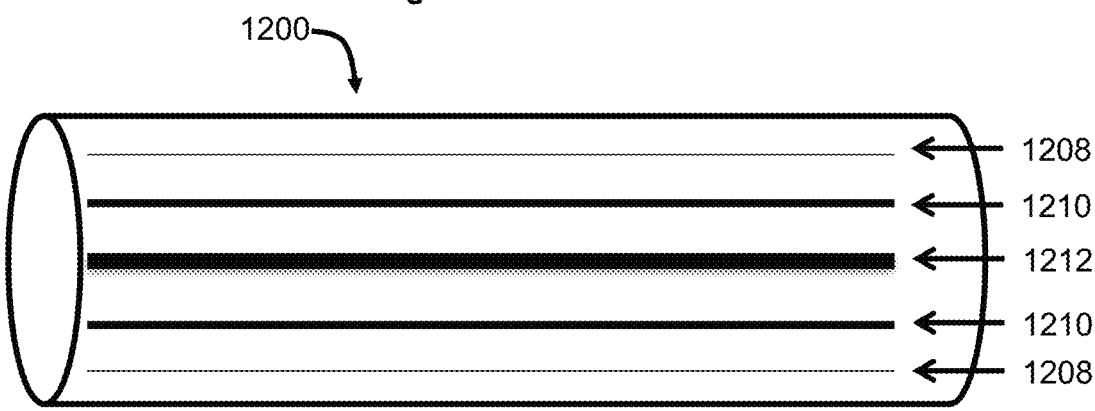
FIG. 12B illustrates multiple 3D objects moving through the pipe to illustrate fluid movement comprising a mixture of 2D lines and 3D objects.

FIG. 12B illustrates multiple 3D objects moving through the pipe to illustrate fluid movement comprising a mixture of 2D lines and 3D objects. FIG. 6C illustrates a lines of various colors. A pipe 1200 (or blood vessel section) is shown. Two lines are illustrated at the periphery 1208 to denote the slowest flow. Two thin 3D objects 1210 are illustrates in an intermediate position to denote the intermediate flow rate. A thicker 3D object 1212 is illustrated in the center to denote the fastest flow rate.

Figure 12C:
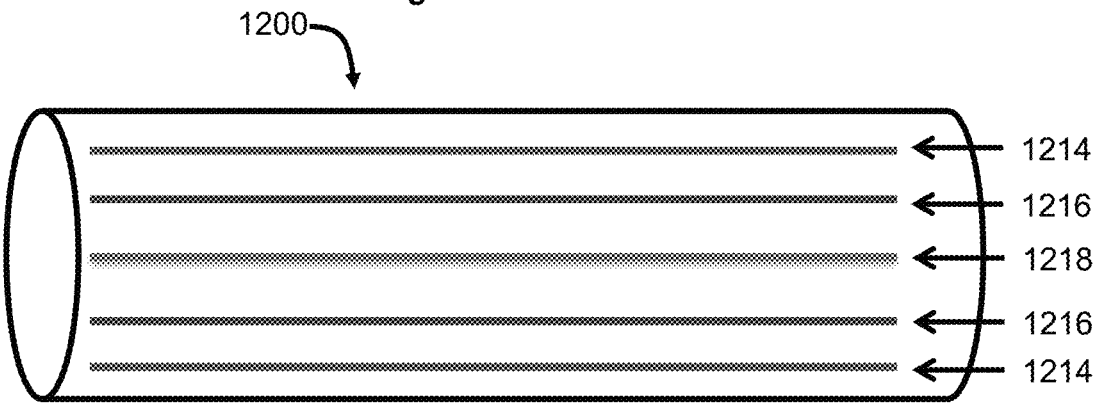
FIG. 12C illustrates multiple 3D objects moving through the pipe to illustrate fluid movement comprising lines of various colors.

FIG. 12C illustrates multiple 3D objects moving through the pipe to illustrate fluid movement comprising lines of various colors. A pipe 1200 (or blood vessel section) is shown. Two red lines 1214 are shown at the periphery to denote the slow flow. Two green lines 1216 are shown in an intermediate position to denote the intermediate flow rate. A blue line 1218 at the center is shown to denote the fastest flow rate. For example, the kinetic energy of tube flow can be modeled. For example, consider $v_m$ at the center of the pipe 1200. $v(r)$ is the velocity at a a distance r away from the center of the pipe. $v(r)$ can be modeled as: $v(r) = v(m)[1 - r^2/R^2]$ where R is the diameter of the pipe 1200. A variety of models more complex models can also be performed.

Figure 13A:
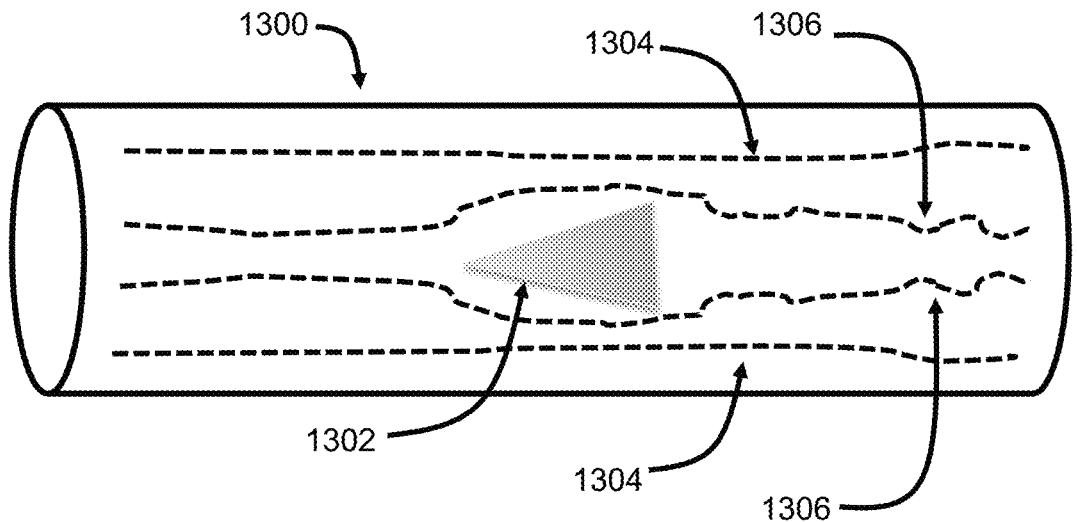
FIG. 13A illustrates an object within the pipe causing turbulent flow, which can be modeled and then illustrated with 3D visualization techniques onto extended reality displays with a top down view of the object and the fluid flow patterns.

FIG. 13A illustrates an object within the pipe causing turbulent flow, which can be modeled and then illustrated with 3D visualization techniques onto extended reality displays with a top down view of the object and the fluid flow patterns. An object within the pipe causing turbulent flow, which can be modeled and then illustrated with 3D visualization techniques onto extended reality displays. The pipe 1300 is shown. A partially obstructing object 1302 within the pipe is shown causing turbulent flow. The flow nearest the periphery of the pipe 1304 is somewhat laminar. The flow closer to the center of the pipe 1306 is turbulent.

Figure 13B:
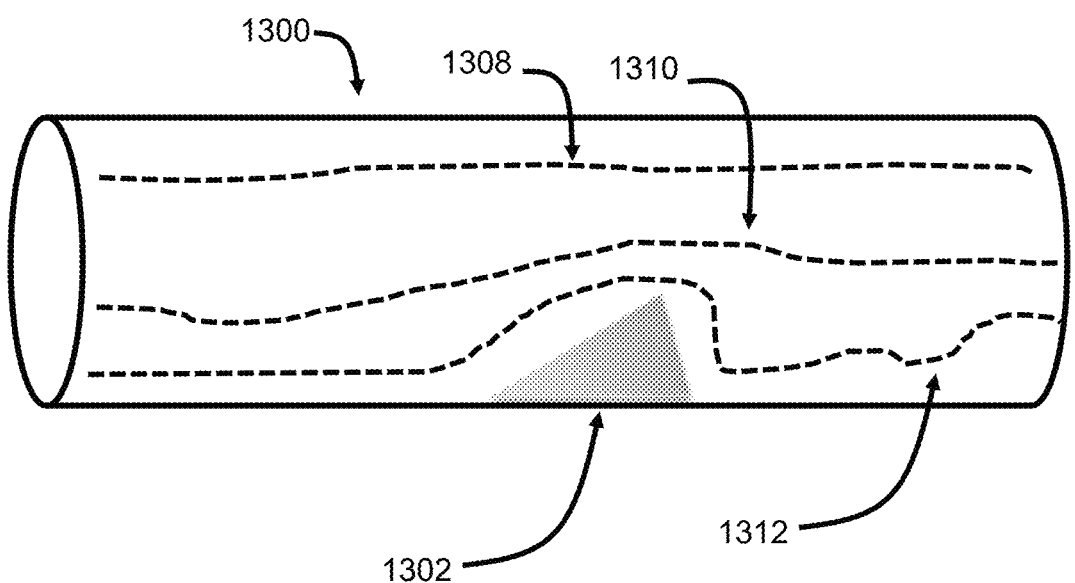
FIG. 13B illustrates an object within the pipe causing turbulent flow, which can be modeled and then illustrated with 3D visualization techniques onto extended reality displays with a side view of the object and the fluid flow patterns.

FIG. 13B illustrates an object within the pipe causing turbulent flow, which can be modeled and then illustrated with 3D visualization techniques onto extended reality displays with a side view of the object and the fluid flow patterns. The flow at the top of the pipe 1308 is somewhat laminar. The flow at the middle of the pipe 1310 is somewhat turbulent. The flow at the bottom of the pipe 1312 is highly turbulent.

Figure 14:
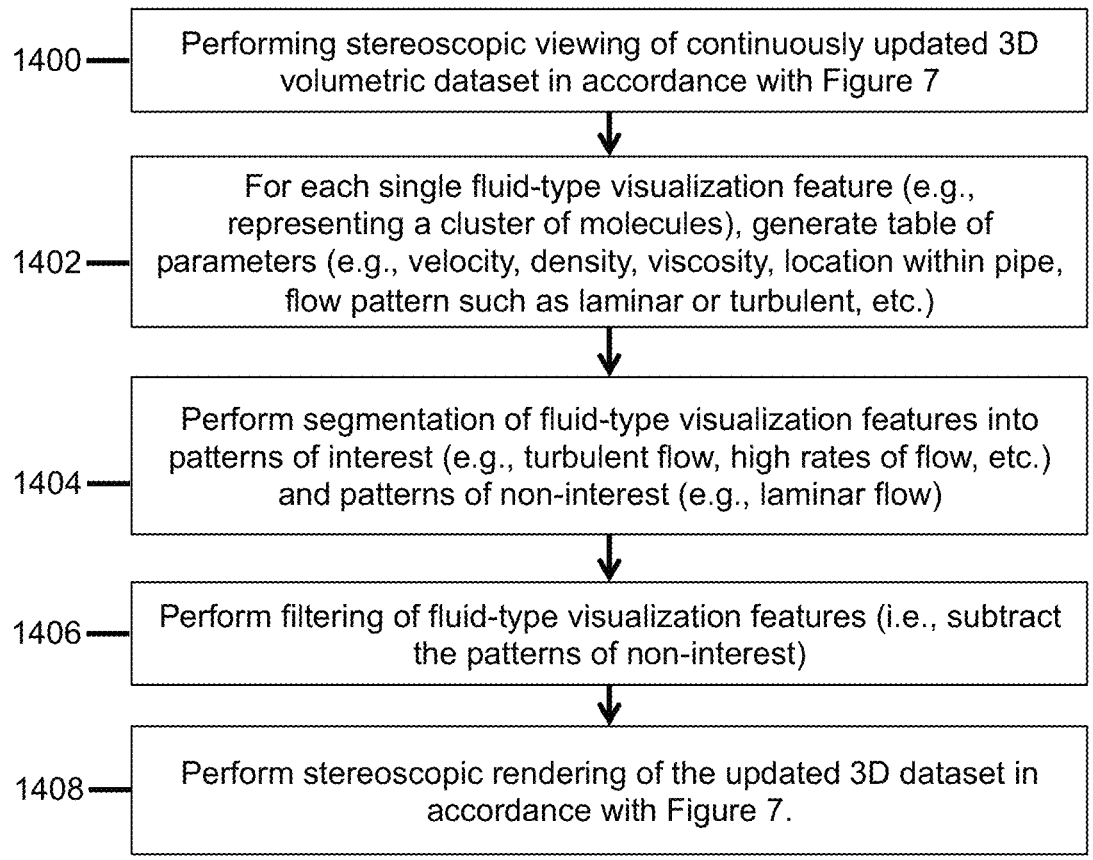
FIG. 14 illustrates a flow diagram describing the segmentation and filtering process to optimize viewing of the flow patterns of interest.

FIG. 14 illustrates a flow diagram describing the segmentation and filtering process to optimize viewing of the flow patterns of interest. The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, Such as initialization of loops and variables and the use of temporary variables are not shown. It will be appreciated by those of ordinary skill in the art that the particular sequence of steps described is illustrative only and can be varied without departing from the spirit of the invention. Thus, the steps can be performed in any convenient or desirable order. Step 1400 is to perform stereoscopic rendering of the continuously updated 3D volumetric dataset in accordance with FIG. 7. Step 1402 is to generate table of parameters (e.g., velocity, density, viscosity, location within pipe, flow pattern such as laminar or turbulent, etc.) for each single fluid-type visualization feature (e.g., representing a cluster of molecules). Step 1404 is to perform segmentation of fluid-type visualization features into patterns of interest (e.g., turbulent flow, high rates of flow, etc.) and patterns of non-interest (e.g., laminar flow). Step 1406 is to perform filtering of fluid-type visualization features (i.e., subtract the patterns of non-interest). Finally, Step 1408 is to perform stereoscopic rendering of the updated 3D dataset in accordance with FIG. 14.

Figure 15A:
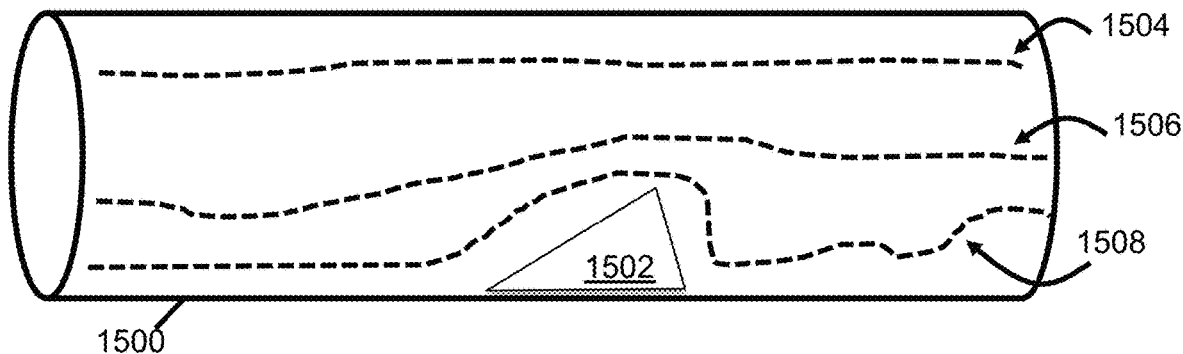
FIG. 15A illustrates an object within a pipe causing turbulent flow, which can be modeled and then illustrated with 3D visualization techniques onto extended reality displays with a side view of the object and the fluid flow patterns.

FIG. 15A illustrates an object within a pipe causing turbulent flow, which can be modeled and then illustrated with 3D visualization techniques onto extended reality displays with a side view of the object and the fluid flow patterns. An object within a pipe causing turbulent flow, which can be modeled and then illustrated with 3D visualization techniques onto extended reality displays. 1504 illustrates slow, laminar flow. 1506 illustrates fast laminar flow. 1508 illustrates slow, turbulent flow.

Figure 15B:
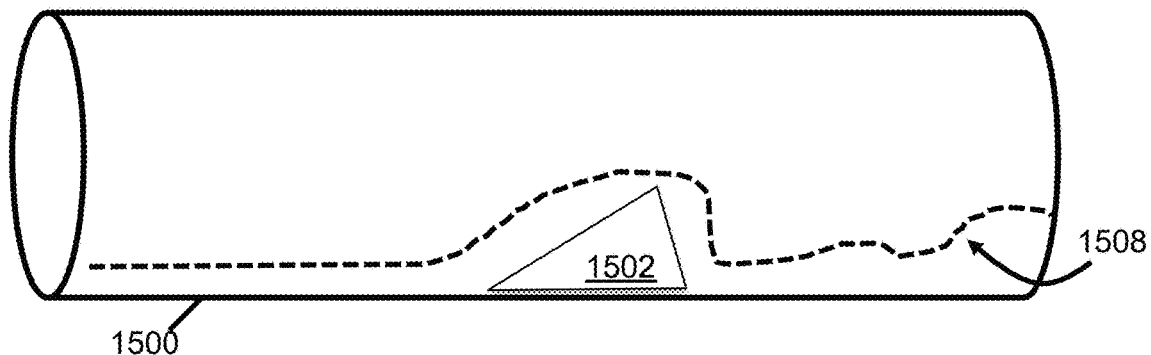
FIG. 15B illustrates an object within a pipe causing turbulent flow, which can be modeled and then illustrated with 3D visualization techniques onto extended reality displays with a side view of the object with the laminar flow-type visualization features subtracted to more clearly visualize the turbulent flow-type visualization feature by the user wearing the extended reality display.

FIG. 15B illustrates an object within a pipe causing turbulent flow, which can be modeled and then illustrated with 3D visualization techniques onto extended reality displays with a side view of the object with the laminar flow-type visualization features subtracted to more clearly visualize the turbulent flow-type visualization feature by the user wearing the extended reality display. 1508 illustrates slow, turbulent flow. The remainder of the types of flow have been filtered (e.g., subtracted or rendered transparent).

Figure 15C:
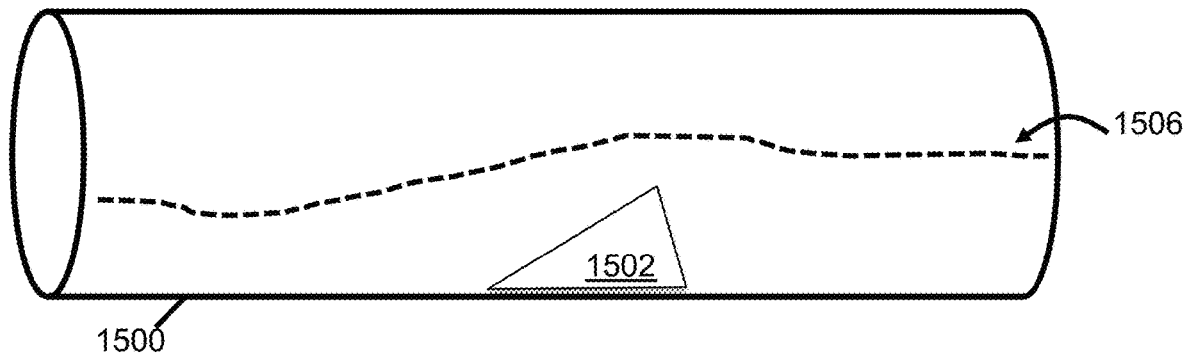
FIG. 15C illustrates an object within a pipe causing turbulent flow, which can be modeled and then illustrated with 3D visualization techniques onto extended reality displays with a side view of the object and the fluid flow patterns with the slow flow-type visualization features subtracted to more clearly visualize the fast flow-type visualization feature by the user wearing the extended reality display.

FIG. 15C illustrates an object within a pipe causing turbulent flow, which can be modeled and then illustrated with 3D visualization techniques onto extended reality displays with a side view of the object and the fluid flow patterns with the slow flow-type visualization features subtracted to more clearly visualize the fast flow-type visualization feature by the user wearing the extended reality display. 1506 illustrates fast laminar flow. The remainder of the types of flow have been filtered (e.g., subtracted or rendered transparent).

Figure 15D:
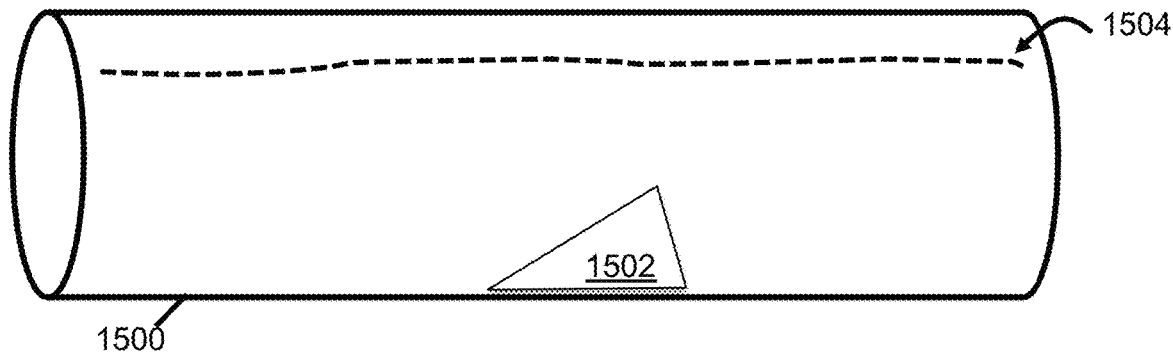
FIG. 15D illustrates an object within a pipe causing turbulent flow, which can be modeled and then illustrated with 3D visualization techniques onto extended reality displays with a side view of the object and the fluid flow patterns where both the fast flow-type visualization feature and the turbulent flow-type visualization feature are subtracted to more clearly visualize the slow, laminar flow.

FIG. 15D illustrates an object within a pipe causing turbulent flow, which can be modeled and then illustrated with 3D visualization techniques onto extended reality displays with a side view of the object and the fluid flow patterns where both the fast flow-type visualization feature and the turbulent flow-type visualization feature are subtracted to more clearly visualize the slow, laminar flow. 1504 illustrates slow, laminar flow. The remainder of the types of flow have been filtered (e.g., subtracted or rendered transparent).

Figure 16A:
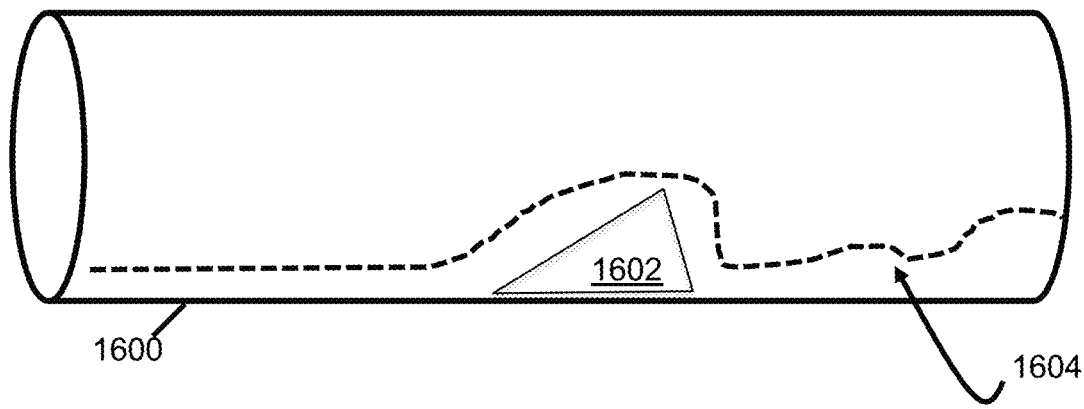
FIG. 16A illustrates different objects within a pipe and varying flow-type visualization features with a small ramp shaped 3D object and minimal turbulence.

FIG. 16A illustrates different objects within a pipe and varying flow-type visualization features with a small ramp shaped 3D object and minimal turbulence. The pipe 1600 is shown. The small ramp shaped 3D object 1602 is shown. A flow-type visualization feature 1604 with minimal turbulence is shown.

Figure 16B:
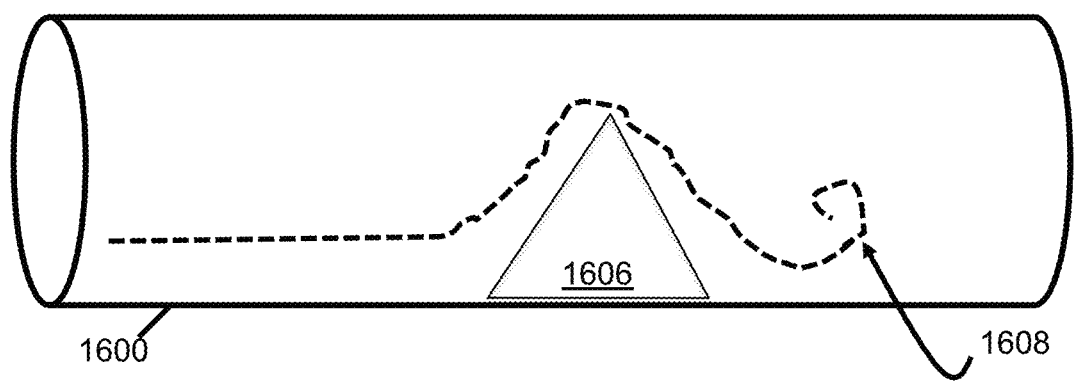
FIG. 16B illustrates different objects within a pipe and varying flow-type visualization features with a large triangular shaped 3D object and significant turbulence.

FIG. 16B illustrates different objects within a pipe and varying flow-type visualization features with a large triangular shaped 3D object and significant turbulence. The pipe 1600 is shown. The large triangular shaped 3D object 1606 is shown. A flow-type visualization feature 1608 with significant turbulence is shown.

Figure 16C:
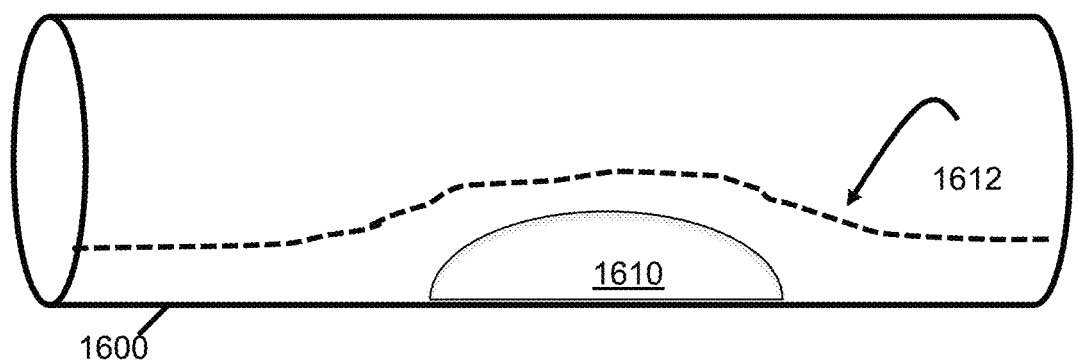
FIG. 16C illustrates different objects within a pipe and varying flow-type visualization features with a wing-shaped 3D object and laminar flow.

FIG. 16C illustrates different objects within a pipe and varying flow-type visualization features with a wing-shaped 3D object and laminar flow. The pipe 1600 is shown. The wing shaped 3D object 1610 is shown. A flow-type visualization feature 1612 with laminar flow is shown. A similar set up of pipe 1600 and wing shaped 3D object 1610 could be performed under fluids of varying viscosity.

Figure 17A:
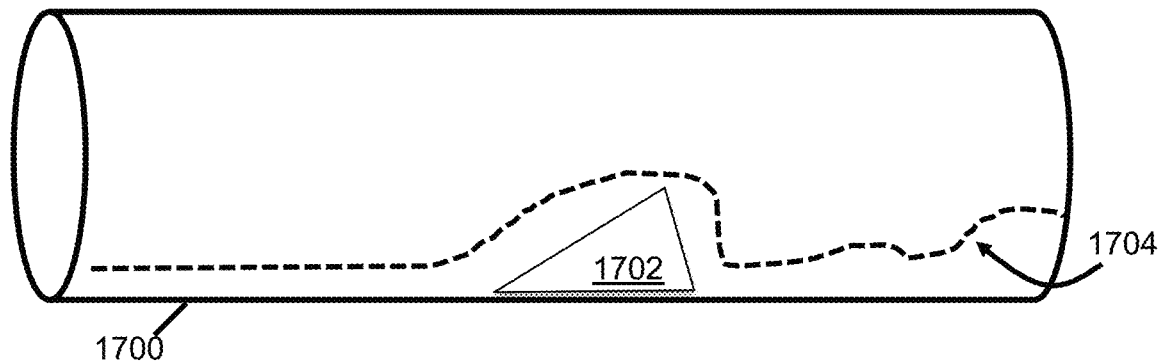
FIG. 17A illustrates two different flow patterns based on varying properties of the fluid or gas in a first set of conditions with a moderate amount of turbulence.

FIG. 17A illustrates two different flow patterns based on varying properties of the fluid or gas in a first set of conditions with a moderate amount of turbulence. A first set of conditions with a moderate amount of turbulence is shown. For example, for blood flow, this could represent a certain hematocrit level. For example, for air flow, this could represent a certain temperature or humidity. The pipe 1700 is shown. The small ramp 1702 is shown. The flow-type visualization feature 1704 shows a moderate amount of turbulence.

Figure 17B:
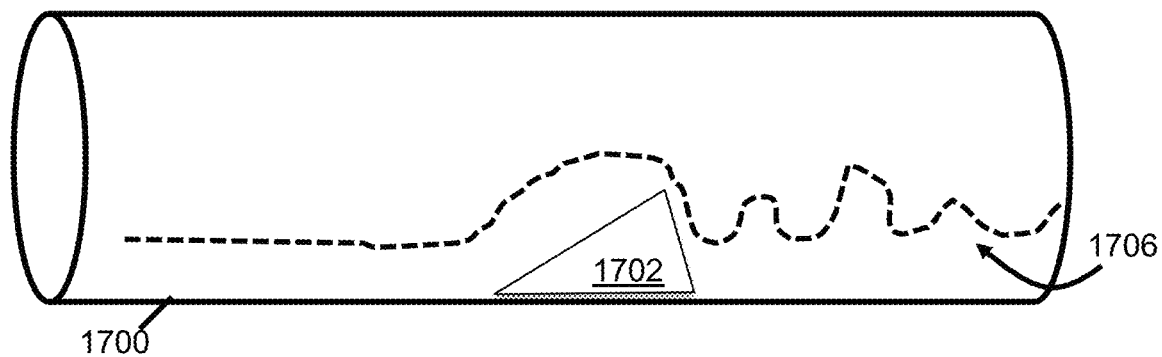
FIG. 17B illustrates two different flow patterns based on varying properties of the fluid or gas in a second set of conditions with a significant amount of turbulence.

FIG. 17B illustrates two different flow patterns based on varying properties of the fluid or gas in a second set of conditions with a significant amount of turbulence. For example, for blood flow, this could represent a different hematocrit level compared to FIG. 17A. For example, for air flow, this could represent a certain temperature or humidity compared to FIG. 17A. The pipe 1700 is shown. The small ramp 1702 is shown. The flow-type visualization feature 1706 is shown. A change in conditions may result in a difference in the flow patterns.

Figure 18A:
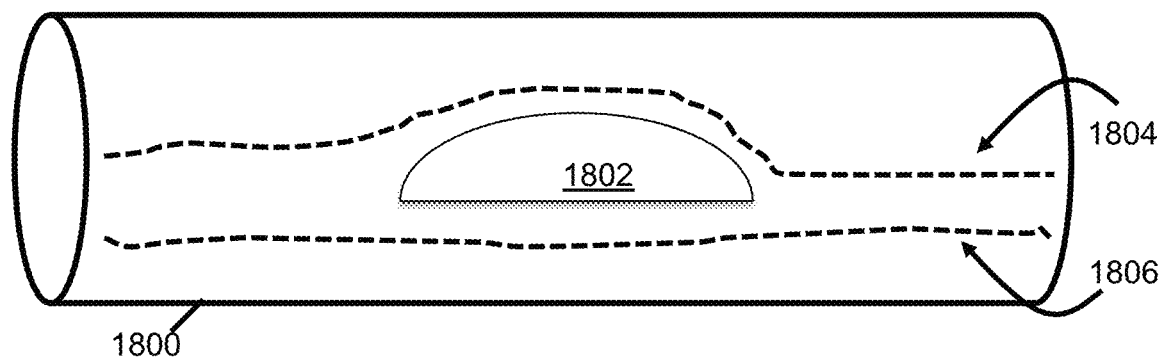
FIG. 18A illustrates different flow-type visualization features over a wing at two different angles of attack with a first angle of attack at approximately 0 degrees and smooth, laminar air flow.

FIG. 18A illustrates different flow-type visualization features over a wing at two different angles of attack with a first angle of attack at approximately 0 degrees and smooth, laminar air flow. The wind tunnel 1800 is shown. The wing 1802 is shown with an approximately 0 degree angle of attack. The flow-type visualization feature 1804 of laminar flow is shown over the top of the wing. The flow-type visualization feature 1806 of laminar flow is shown under the bottom of the wing.

Figure 18B:
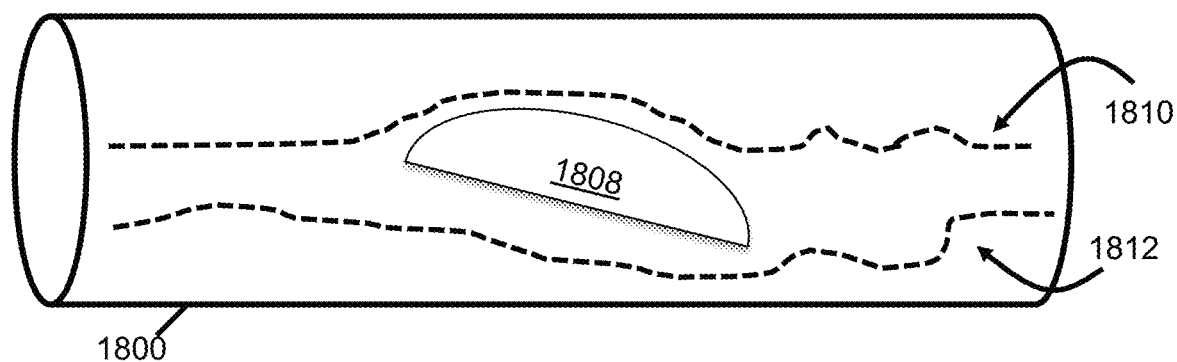
FIG. 18B illustrates different flow-type visualization features over a wing at two different angles of attack with a second angle of attack at approximately 20 degrees with some smooth, laminar air flow over the leading edge of the wing (on the left) and more turbulent air flow over the trailing edge of the wing (on the right).

FIG. 18B illustrates different flow-type visualization features over a wing at two different angles of attack with a second angle of attack at approximately 20 degrees with some smooth, laminar air flow over the leading edge of the wing (on the left) and more turbulent air flow over the trailing edge of the wing (on the right). The wind tunnel 1800 is shown. The wing 1808 is shown with an approximately 20 degree angle of attack. The flow-type visualization feature 1810 is shown over the top of the wing with some smooth, laminar air flow over the leading edge of the wing (on the left) and more turbulent air flow over the trailing edge of the wing (on the right). The flow-type visualization feature 1812 is shown underneath the bottom of the wing with some smooth, laminar air flow over the leading edge of the wing (on the left) and more turbulent air flow over the trailing edge of the wing (on the right).

Figure 19A:
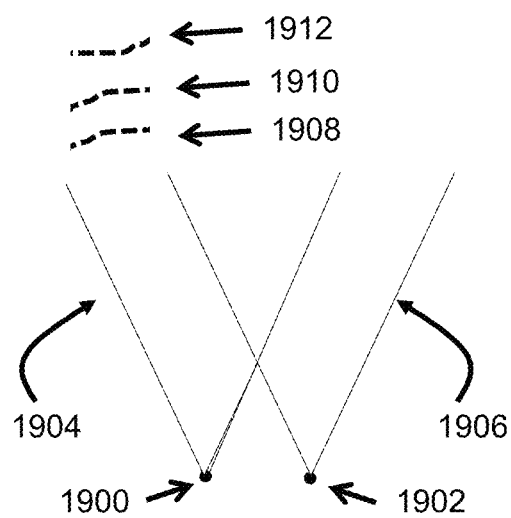
FIG. 19A illustrates stereoscopic viewing of the flow-type visualization features at an early time point without filtering.

FIG. 19A illustrates stereoscopic viewing of the flow-type visualization features at an early time point without filtering. The left eye view point 1900 is shown. The right eye view point 1902 is shown. The left eye viewing angle 1904 is shown. The right eye viewing angle 1906 is shown. A first portion of a first flow-type visualization feature 1908 is shown. A first portion of a second flow-type visualization feature 1910 is shown. A first portion of a third flow-type visualization feature 1912 is shown.

Figure 19B:
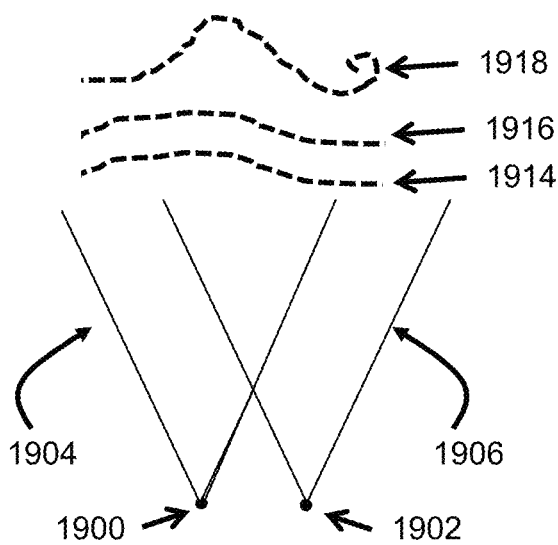
FIG. 19B illustrates stereoscopic viewing of the flow-type visualization features at a later time point without filtering.

FIG. 19B illustrates stereoscopic viewing of the flow-type visualization features at an later time point without filtering. The left eye view point 1900 is shown. The right eye view point 1902 is shown. The left eye viewing angle 1904 is shown. The right eye viewing angle 1906 is shown. The entire first flow-type visualization feature 1914 is shown and is revealed to be laminar flow. The entire second flow-type visualization feature 1910 is shown and is revealed to be laminar flow. The entire third flow-type visualization feature 1912 is shown and is revealed to be turbulent flow. In this scenario without filtering, from the user's left eye view point 1900, left eye viewing angle 1904, right eye view point 1902, right eye viewing angle 1906, the user would see all of the flow-type visualization features superimposed on one another and the images would be confusing or as a minimum, the fine details of the third flow-type visualization feature 1918 would be sub-optimally appreciated during both the early time point and the later time point.

Figure 19C:
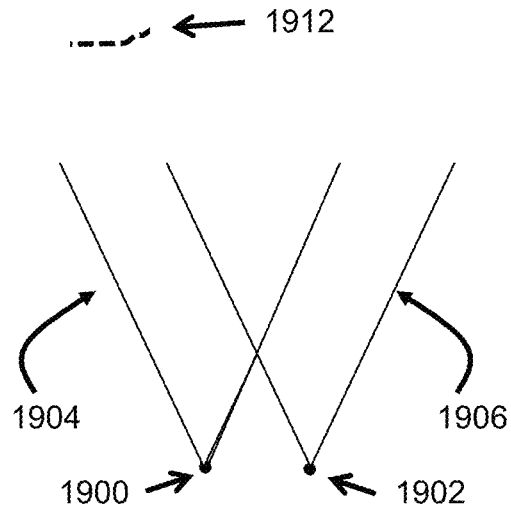
FIG. 19C illustrates a stereoscopic viewing of the flow-type visualization features at an early time point with filtering of the laminar flow-type visualization features, such that the turbulent-type visualization features can be better seen in an unhindered fashion.

FIG. 19C illustrates a stereoscopic viewing of the flow-type visualization features at an early time point with filtering of the laminar flow-type visualization features, such that the turbulent-type visualization features can be better seen in an unhindered fashion. The left eye view point 1900 is shown. The right eye view point 1902 is shown. The left eye viewing angle 1904 is shown. The right eye viewing angle 1906 is shown. A first portion of a third flow-type visualization feature 1912 is shown.

Figure 19D:
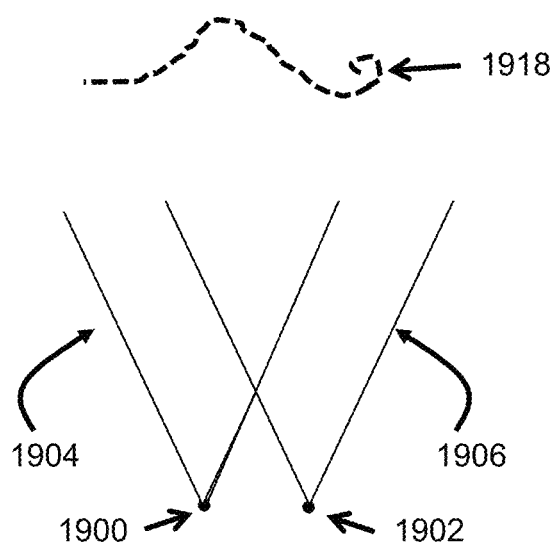
FIG. 19D illustrates stereoscopic viewing of the flow-type visualization features at an later time point with filtering of the laminar flow-type visualization features, such that the turbulent-type visualization features can be better seen in an unhindered fashion.

FIG. 19D illustrates stereoscopic viewing of the flow-type visualization features at a later time point with filtering. The left eye view point 1900 is shown. The right eye view point 1902 is shown. The left eye viewing angle 1904 is shown. The right eye viewing angle 1906 is shown. The entire third flow-type visualization feature 1918 is shown and is revealed to be turbulent flow. In this scenario out filtering, from the user's left eye view point 1900, left eye viewing angle 1904, right eye view point 1902, right eye viewing angle 1906, the user would only see the third flow-type visualization feature 1918 and viewing would be unhindered by the other flow-type visualization features. Thus, by segmenting the flow-type visualization features by their parameters (e.g., flow rate, flow-type, location, and other features) using this described filtering process to subtract out the flow-type visualization features of non-interest (e.g., laminar flow), the flow-type visualization features of interest (e.g., turbulent flow) are more optimally visualized.

Figure 20:
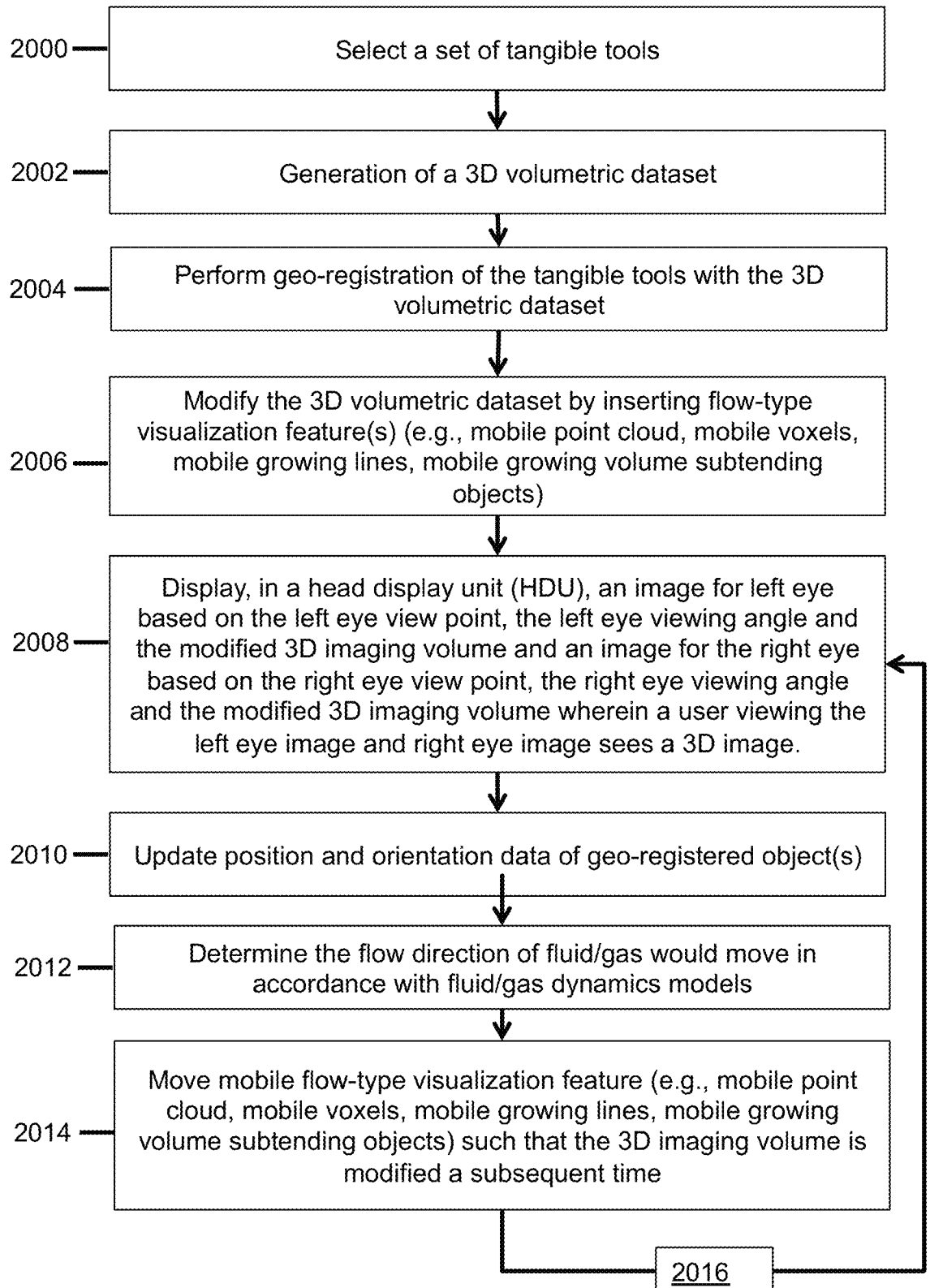
FIG. 20 illustrates the interaction between tangible tools and visualization of virtual fluids passing over the tangible tools.

FIG. 20 illustrates the interaction between tangible tools and visualization of virtual fluids passing over the tangible tools. Step 2000 is to select a set of tangible tools. Step 2002 is to generate a 3D volumetric dataset. An example of this could be by building a volumetric dataset from cross-sectional imaging examinations (e.g., CT or MRI scans). Another example would be to build a 3D volumetric dataset through software platforms such as Unity or Unreal Engine. Step 2004 is to perform geo-registration of the tangible tools with the 3D volumetric dataset. For details on this step, please refer to U.S. patent application Ser. No. 16/524,275 paragraphs [0003]-[0031] and FIGS. 1-20. Step 2006 is to modify the 3D volumetric dataset by inserting flow-type visualization feature(s) (e.g., mobile point cloud, mobile voxels, mobile growing lines, mobile growing volume subtending objects). Step 2008 is to display, in a head display unit (HDU), an image for left eye based on the left eye view point, the left eye viewing angle and the modified 3D imaging volume and an image for the right eye based on the right eye view point, the right eye viewing angle and the modified 3D imaging volume wherein a user viewing the left eye image and right eye image sees a 3D image. The preferred embodiment is a mixed reality or augmented reality headset. Step 2010 is to update position and orientation data of geo-registered object(s). Step 2012 is to determine the flow direction of fluid/gas would move in accordance with fluid/gas dynamics models. Step 2014 is to move mobile flow-type visualization feature (e.g., mobile point cloud, mobile voxels, mobile growing lines, mobile growing volume subtending objects) such that the 3D imaging volume is modified a subsequent time. Step 2016 is to return to step 2008. It is important to note that this process is performed in real time at a frame rate fast enough to account for the user's movements of head position, eye movements, and any other factors. Thus, as long as the fluid is moving, the volume is rendered over and over again.

Figure 21A:
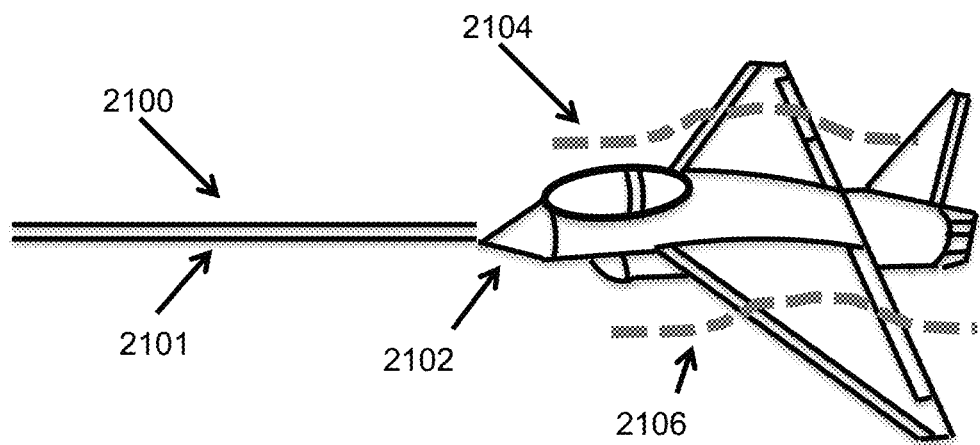
FIG. 21A illustrates a model airplane interacting with virtual fluids at a first angle of attack.

FIG. 21A illustrates a model airplane interacting with virtual fluids at a first angle of attack. In this embodiment, an instructor pilot can be explaining to a group of student pilots the concept of airflow over a wing surface. This can give them a visual understanding. Various factors can be taught via visual display, which include, but are not limited to the following: angles of attack; and, wingtip vortices. 2100 illustrates the relative wind. 2101 is the chord of the airplane. Note that the angle of attack is approximately 0 degrees. 2102 illustrates the airplane. 2104 illustrates laminar flow over the right wing. 2016 illustrates laminar flow over the left wing.

Figure 21B:
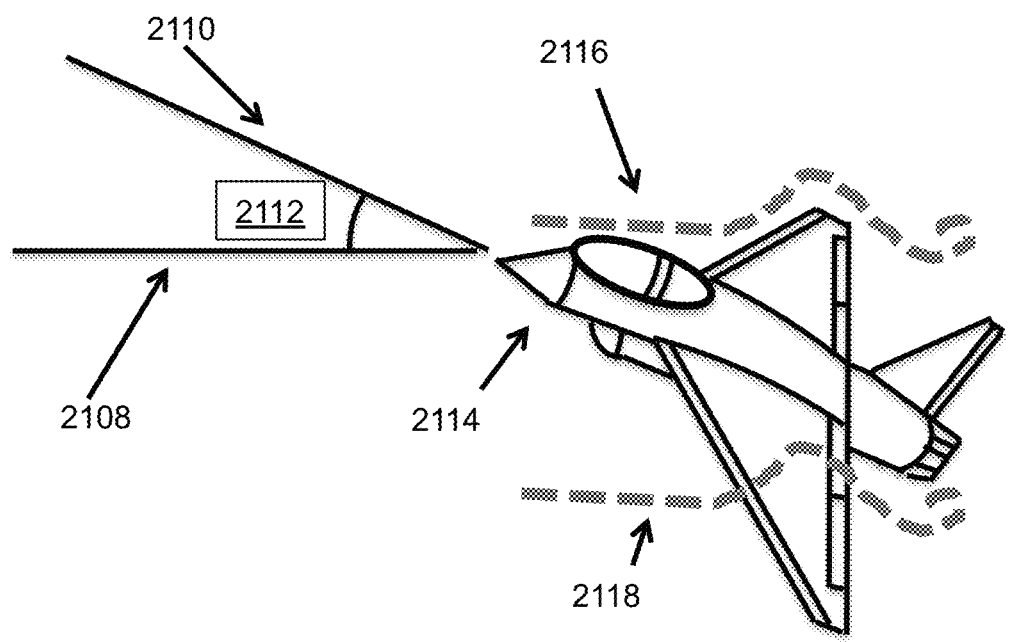
FIG. 21B illustrates a model airplane interacting with virtual fluids at a second angle of attack.

FIG. 21B illustrates a model airplane interacting with virtual fluids at a second angle of attack. 2108 illustrates the relative wind. 2110 illustrates the cord of the airplane. Note that the angle of attack 2112 is approximately 30 degrees. 2114 illustrates the airplane. 2116 illustrates turbulent flow over the right wing. 2118 illustrates turbulent flow over the left wing. Other embodiments can be outside the field of aeronautics and into a wide range of other fields. For example, in the field of medicine, applications include, but are not limited to the following: placing virtual anatomic features (seen on the HDU) onto the 3D printed object. For example, a section of an abdominal aortic aneurysm can be printed and the blood flow through the aneurysm could be shown with the HDU.

Figure 22A:
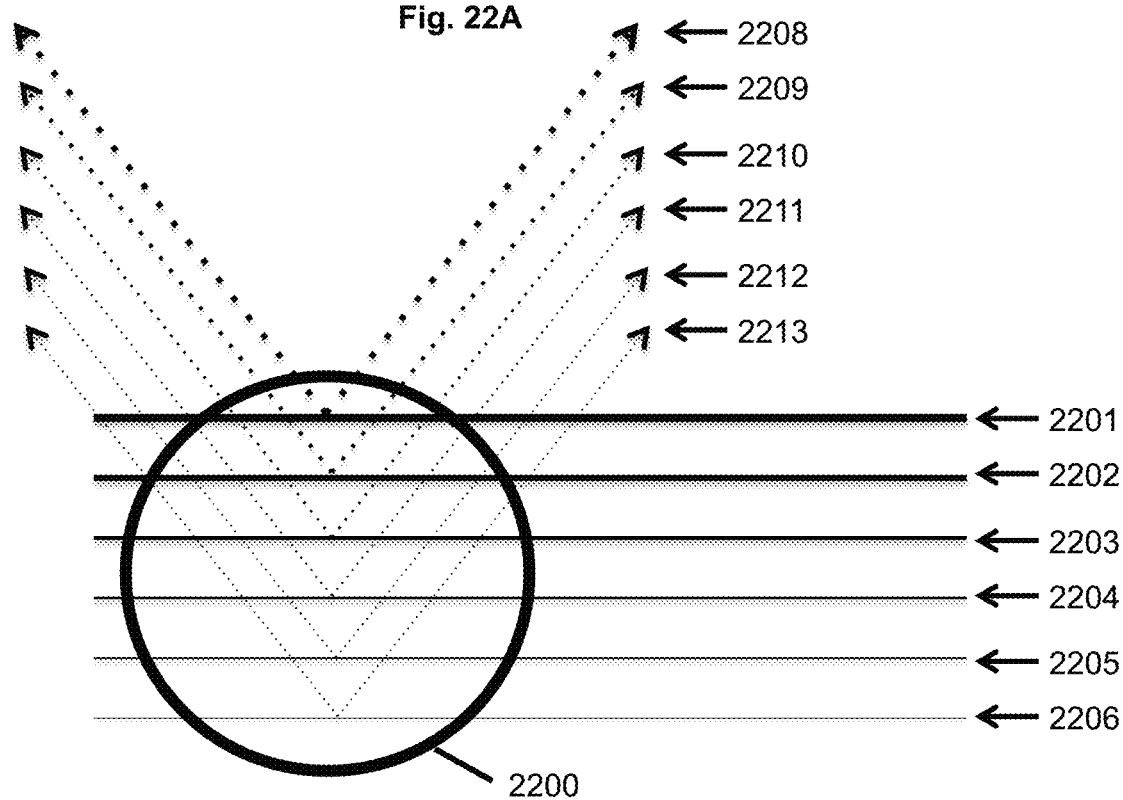
FIG. 22A illustrates a guitar with 3D visualization of virtual sound waves.

FIG. 22A illustrates a guitar with 3D visualization of virtual sound waves. Such a process could be used for educational purposes, especially for those with hearing loss or are tone deaf. 2200 illustrates the hole in the guitar. 2201 illustrates the first string. 2202 illustrates the second string. 2203 illustrates the third string. 2204 illustrates the fourth string. 2205 illustrates the fifth string. 2206 illustrates the sixth string. In this example, all 6 strings are strum by a user. Virtual visual feedback, such as a first set of dotted lines 2208, correspond to the first string 2201. Virtual visual feedback, such as a second set of dotted lines 2209, correspond to the second string 2202. Virtual visual feedback, such as a third set of dotted lines 2210, correspond to the third string 2203. Virtual visual feedback, such as a fourth set of dotted lines 2211, correspond to the fourth string 2204. Virtual visual feedback, such as a fifth set of dotted lines 2212, correspond to the fifth string 2205. Virtual visual feedback, such as a sixth set of dotted lines 2213, correspond to the sixth string 2206.

Figure 22B:
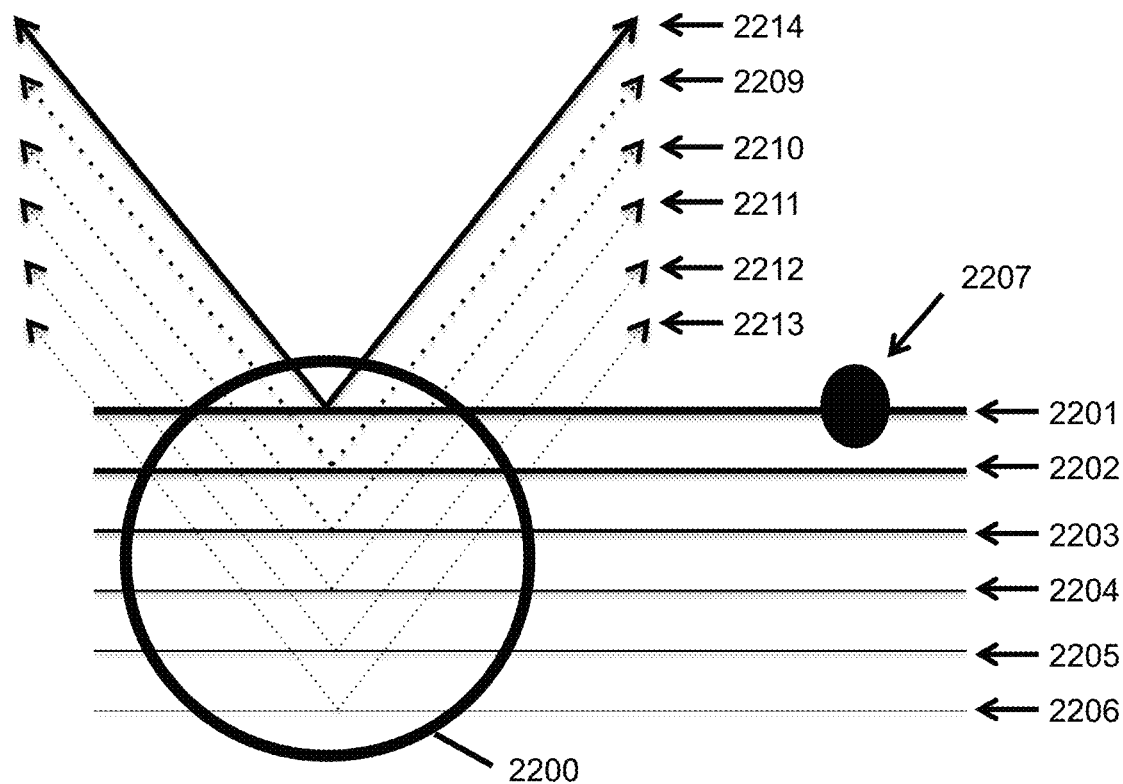
FIG. 22B illustrates an upper respiratory track with virtual sound waves and virtual air flow interacting.

FIG. 22B illustrates a guitar with 3D visualization of virtual sound waves. 2200 illustrates the hole in the guitar. 2201 illustrates the first string. 2202 illustrates the second string. 2203 illustrates the third string. 2204 illustrates the fourth string. 2205 illustrates the fifth string. 2206 illustrates the sixth string. In this example, all 6 strings are strum by a user under a slightly different condition. Namely, 2207 illustrates a fret wherein the string is pressed to shorten the vibrating length of the string. Virtual visual feedback, such as a first set of solid lines 2214, correspond to the first string 2201. Note that the first set of solid lines 2214 is different from the first set of dotted lines 2208 in FIG. 22A. Virtual visual feedback, such as a second set of dotted lines 2209, correspond to the second string 2202. Virtual visual feedback, such as a third set of dotted lines 2210, correspond to the third string 2203. Virtual visual feedback, such as a fourth set of dotted lines 2211, correspond to the fourth string 2204. Virtual visual feedback, such as a fifth set of dotted lines 2212, correspond to the fifth string 2205. Virtual visual feedback, such as a sixth set of dotted lines 2213, correspond to the sixth string 2206. Other examples outside of music include visualization of the upper respiratory track with virtual sound waves and virtual air flow interacting. This will give both auditory and visual feedback when learning an instrument. Acoustic models can be used to determine the direction that sound will travel.

Several features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method of three-dimensional viewing of images by a user comprising:
generating a 3D volumetric dataset containing a blood vessel;
predicting a flow pattern within the blood vessel based on a fluid dynamics model performed within the blood vessel;
dividing the flow pattern into at first portion and at least one additional portion;
generating a first flow-type visualization feature with a first visual appearance to correspond to the first portion of the flow pattern;
generating at least one additional flow-type visualization feature with at least one additional visual appearance to correspond to the at least one additional portion of the flow pattern;
modifying the 3D volumetric dataset by inserting the first flow-type visualization feature and the at least one additional flow-type visualization feature to create a modified 3D volumetric dataset;
displaying the modified 3D volumetric dataset.

2. The method of claim 1 further comprising wherein displaying the modified 3D volumetric dataset is performed on a head display unit (HDU) with an image for left eye based on the left eye view point, the left eye viewing angle and the modified 3D volumetric dataset imaging volume and an image for the right eye based on the right eye view point, the right eye viewing angle and the modified 3D imaging volume wherein a user viewing the left eye image and right eye image sees a 3D image.

3. The method of claim 1 further comprises dividing the flow pattern into the first portion and the at least one additional portion by a type of flow wherein the type of flow comprises one of the group consisting of laminar flow and turbulent flow.

4. The method of claim 1 further comprises dividing the flow pattern into the first portion and the at least one additional portion by a speed of flow.

5. The method of claim 1 where the visual appearance of the first flow-type visualization feature and the at least one additional flow-type visualization feature comprises one of the group of mobile point cloud, mobile lines, mobile voxels, mobile growing volume subtending objects.

6. The method of claim 1 where the visual appearance of the first flow-type visualization feature and the at least one additional flow-type visualization feature comprises one of the group of varying colors, varying brightness, varying textures, varying shapes, varying sizes, varying speeds of movement, varying directions of movement.

7. The method of claim 1 where the rate of movement of the first flow-type visualization feature and the at least one additional flow-type visualization feature is adjustable.

8. The method of claim 1 where an aspect of the 3D volumetric dataset changes and the flow-type visualization feature is correspondingly altered.

9. The method of claim 1 where the properties of the fluid changes and the flow-type visualization feature is correspondingly altered.

10. A method comprising:
selecting a set of tangible tools;
generating a 3D volumetric dataset;
performing geo-registration of the tangible tools with the 3D volumetric dataset;
modifying the 3D volumetric dataset by inserting flow-type visualization feature(s);
displaying, in a head display unit (HDU), an image for left eye based on the left eye view point, the left eye viewing angle and the modified 3D volumetric dataset and an image for the right eye based on the right eye view point, the right eye viewing angle and the modified 3D volumetric dataset wherein a user viewing the left eye image and right eye image sees a 3D image;
updating position and orientation data of the set of tangible tools;
determining the flow direction of fluid/gas would move in accordance with fluid/gas dynamics models; and
moving the mobile flow-type visualization feature(s) such that the 3D imaging volume is modified a subsequent time.

11. The method of claim 10 wherein the flow-type visualization feature(s) comprise at least one of the group of mobile point cloud, mobile voxels, mobile growing lines, and mobile growing volume subtending objects.

12. The method of claim 10 wherein the flow-type visualization feature(s) are segmented by properties.

13. The method of claim 10 wherein the flow-type visualization feature(s) are filtered.

14. A method comprising:
selecting a set of tangible tools;
utilizing a 3D volumetric dataset;
performing geo-registration of the tangible tools with the 3D volumetric dataset;
modifying the 3D volumetric dataset by inserting sound-type visualization feature(s); and
displaying, in a head display unit (HDU), an image for left eye based on the left eye view point, the left eye viewing angle and the modified 3D imaging volume and an image for the right eye based on the right eye view point, the right eye viewing angle and the modified 3D imaging volume wherein a user viewing the left eye image and right eye image sees a 3D image;

updating position and orientation data of the tangible tools;

determining the flow direction that sound would move in accordance with acoustic models; and moving mobile sound-type visualization feature such that the 3D imaging volume is modified a subsequent time.

15. The method of claim 14 wherein the sound-type visualization features comprise at least one of the group of mobile point cloud, mobile voxels, mobile growing lines, and mobile growing volume subtending objects.

16. The method of claim 14 wherein the sound-type visualization feature(s) are segmented by properties.

17. The method of claim 14 wherein the sound-type visualization feature(s) are filtered.

18. The method of claim 14 wherein the tangible tools include musical instruments.

19. A method comprising:

selecting a musical instrument;

generating a 3D volumetric dataset;

performing geo-registration of the musical instrument with the 3D volumetric dataset;

modifying the 3D volumetric dataset by inserting sound-type visualization feature(s); and displaying, in a head display unit (HDU), an image for left eye based on the left eye view point, the left eye viewing angle and the modified 3D imaging volume and an image for the right eye based on the right eye view point, the right eye viewing angle and the modified 3D imaging volume wherein a user viewing the left eye image and right eye image sees a 3D image.

20. The method of claim 19 wherein the sound-type visualization feature(s) comprise at least one of the group of mobile point cloud, mobile voxels, mobile growing lines, and mobile growing volume subtending objects.

21. The method of claim 19 wherein the sound-type visualization feature(s) are segmented by properties.

22. The method of claim 19 wherein the sound-type visualization feature(s) are filtered.

* * * * *